United States Patent
Jeon et al.

(10) Patent No.: US 9,374,570 B2
(45) Date of Patent: Jun. 21, 2016

(54) APPARATUS AND METHOD FOR CORRECTING DEPTH MAP FOR THREE-DIMENSIONAL IMAGE

(71) Applicant: LG Display Co., Ltd., Seoul (KR)

(72) Inventors: Ho-Min Jeon, Paju-si (KR); Seong-Gyun Kim, Gunpo-si (KR)

(73) Assignee: LG DISPLAY CO., LTD., Seoul (KR)

( * ) Notice: Subject to any disclaimer, the term of this patent is extended or adjusted under 35 U.S.C. 154(b) by 247 days.

(21) Appl. No.: 14/085,336

(22) Filed: Nov. 20, 2013

(65) Prior Publication Data
US 2014/0146041 A1 May 29, 2014

(30) Foreign Application Priority Data
Nov. 23, 2012 (KR) .................. 10-2012-0133373

(51) Int. Cl.
G06T 15/08 (2011.01)
H04N 13/00 (2006.01)
G06T 5/00 (2006.01)
G06T 7/00 (2006.01)

(52) U.S. Cl.
CPC ............ *H04N 13/0022* (2013.01); *G06T 5/005* (2013.01); *G06T 7/0022* (2013.01); *G06T 2207/10028* (2013.01); *H04N 2213/003* (2013.01)

(58) Field of Classification Search
None
See application file for complete search history.

(56) References Cited

U.S. PATENT DOCUMENTS

| | | | |
|---|---|---|---|
| 2009/0237491 A1* | 9/2009 | Saito | G01C 11/06 348/47 |
| 2012/0123718 A1 | 5/2012 | Ko et al. | |
| 2012/0127284 A1* | 5/2012 | Bar-Zeev | G02B 27/017 348/53 |
| 2013/0038600 A1* | 2/2013 | Wang | H04N 19/597 345/419 |
| 2014/0198977 A1* | 7/2014 | Narasimha | G06T 5/007 382/154 |

FOREIGN PATENT DOCUMENTS

| | | |
|---|---|---|
| CN | 101677408 | 3/2010 |
| CN | 101820552 | 9/2010 |
| CN | 102098528 | 6/2011 |
| CN | 102457755 | 5/2012 |

OTHER PUBLICATIONS

Office Action for Chinese Patent Application No. 201310594835.X, Mar. 30, 2015, 14 pages.

* cited by examiner

*Primary Examiner* — Tize Ma
(74) *Attorney, Agent, or Firm* — Fenwick & West LLP

(57) ABSTRACT

Disclosed are an apparatus and method for correcting a depth map for a three-dimensional image, which are capable of accurately correcting an initially-generated depth map in accordance with characteristics of an image, thereby achieving an enhancement in picture quality of a three-dimensional image. The disclosed apparatus includes an original depth map generating unit for generating an original depth map for frame image data externally supplied to the original depth map generating unit, and a depth map correcting unit for analyzing the externally-supplied frame image data, calculating an image pattern of the frame image data and per-pixel brightness values of the frame image data, based on results of the analysis, and correcting the original depth map output from the original depth map generating unit, based on the calculated image pattern and the calculated brightness values, thereby generating a corrected depth map.

34 Claims, 11 Drawing Sheets

FIG. 3
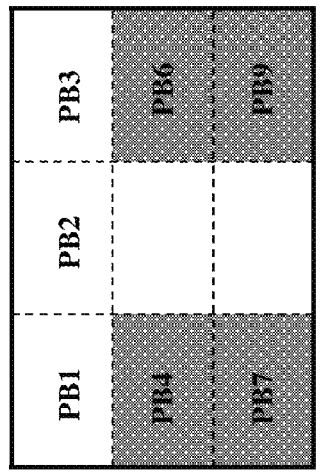
(a) first image pattern
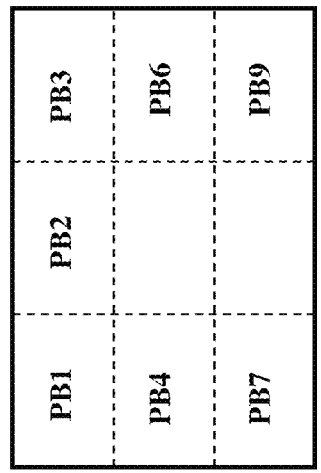
(b) second image pattern
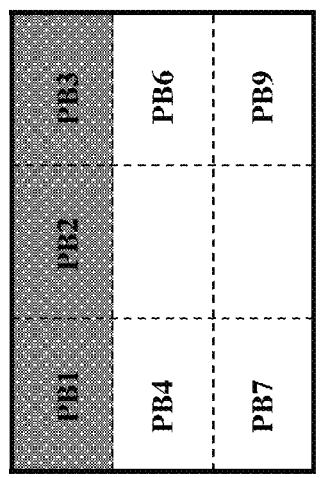
(c) third image pattern
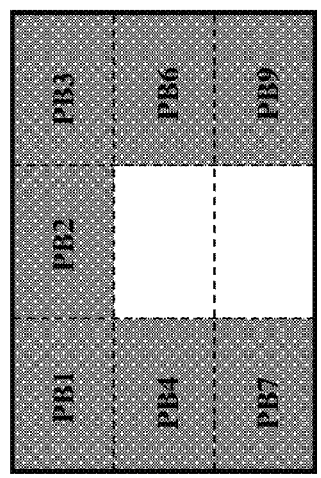
(d) fourth image pattern

FIG. 9
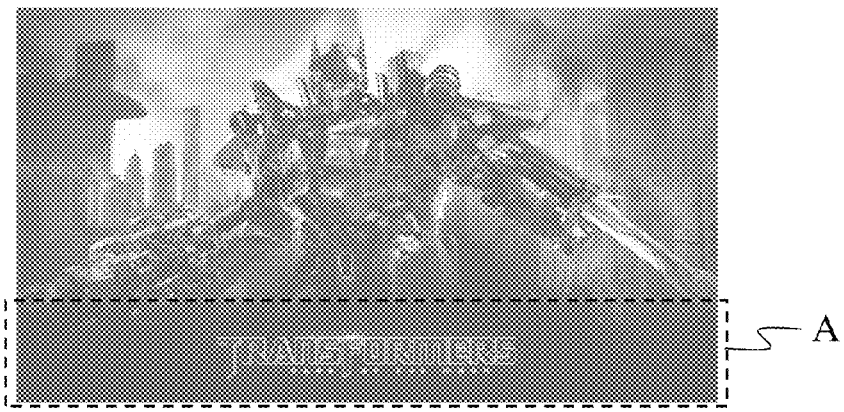
(a)
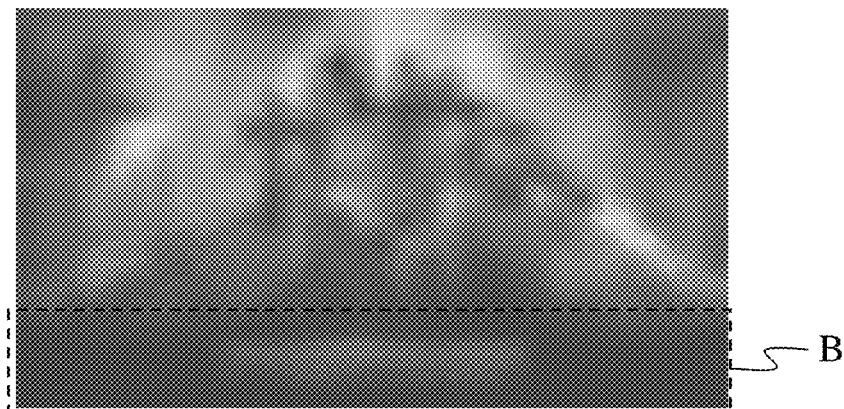
(b)
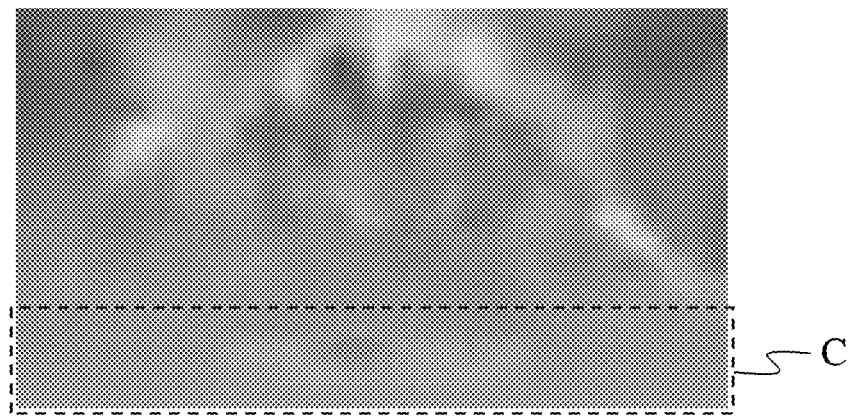
(c)

FIG. 10
(a)
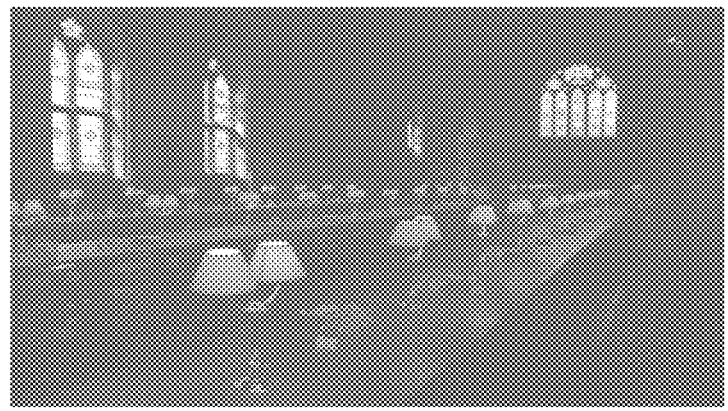
(b)
(c)

FIG. 11
(a) 
(b) 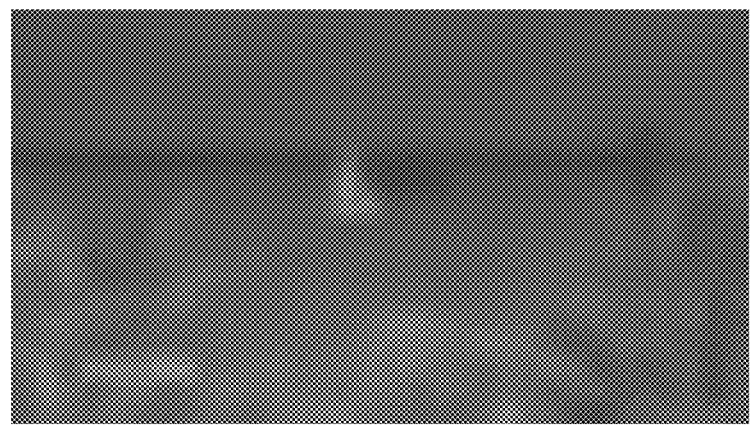
(c) 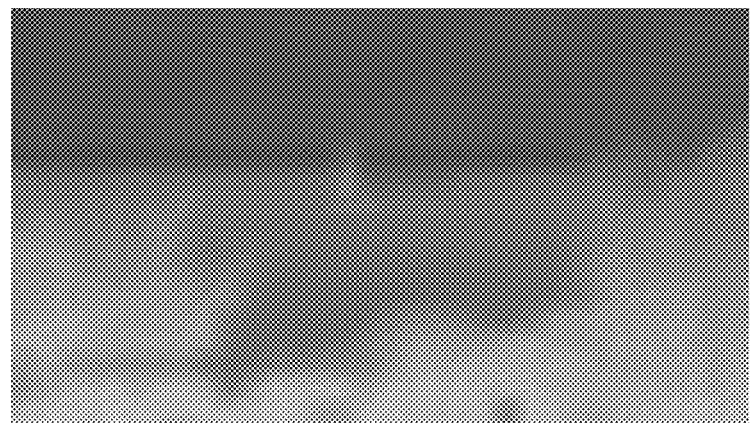

APPARATUS AND METHOD FOR CORRECTING DEPTH MAP FOR THREE-DIMENSIONAL IMAGE

CROSS-REFERENCE TO RELATED APPLICATIONS

This application claims the benefit of the Korean Patent Application No. 10-2012-0133373 filed on Nov. 23, 2012 which is hereby incorporated by reference as if fully set forth herein.

BACKGROUND OF THE INVENTION

1. Field of the Invention

The present invention relates to an apparatus for correcting a three-dimensional image depth map required for conversion of a two-dimensional image into a three-dimensional image, and, more particularly, to a three-dimensional image depth map correcting apparatus and method, which are capable of accurately correcting an initially-generated depth map in accordance with characteristics of an image, thereby achieving an enhancement in picture quality of a three-dimensional image.

2. Discussion of the Related Art

As three-dimensional image rendering methods, there are mainly a method (three-dimensional image rendering method) in which a depth map is generated, based on two-dimensional left-eye and right-eye images generated for rendering of a three-dimensional image, and a three-dimensional image is rendered, using the generated depth map, and a method (three-dimensional image conversion method) in which a depth map is generated, based on a two-dimensional image generated for two-dimensional image rendering, and the two-dimensional image is converted into a three-dimensional image, for three-dimensional image rendering.

In accordance with a conventional three-dimensional image conversion method, three-dimensional distances of subjects in an image are determined, based on statistical brightness and color characteristics of the image. Generally, a subject exhibiting high brightness in an image is assigned a statistically high depth value and, as such, is rendered in a depth map so as to protrude forwardly. On the other hand, a subject exhibiting low brightness in the image is assigned a statistically low depth value and, as such, is rendered in the depth map so as to cave backwardly. Such a depth map, which is generated, based on statistical values, effectively reflects various characteristics of an image. However, when an image has characteristics that a subject exhibiting dark color (for example, black) is arranged ahead of a subject exhibiting light color (for example, white), a depth map for such an image may have a high possibility that the depth map cannot accurately render the original characteristics of the image. This is because conventional three-dimensional image conversion apparatuses may erroneously determine that the light-color subject is arranged at a front side, and the dark-color subject is arranged at a side behind the light-color subject and, as such, may generate a depth map having erroneous information.

The picture quality of a three-dimensional image is influenced by accuracy of a depth map for the three-dimensional image. To this end, to enhance the picture quality of the three-dimensional image, it is important to accurately correct erroneous information of the depth map.

In conventional cases, however, it may be impossible to accurately correct erroneous information of the depth map. For this reason, conventional cases still have a problem of degradation in picture quality of a three-dimensional image.

SUMMARY OF THE INVENTION

Accordingly, the present invention is directed to an apparatus and method for correcting a depth map for a three-dimensional image that substantially obviates one or more problems due to limitations and disadvantages of the related art.

An object of the present invention is to provide to a three-dimensional image depth map correcting apparatus and method, which are capable of accurately correcting an initially-generated depth map in accordance with characteristics of an image, thereby achieving an enhancement in picture quality of a three-dimensional image.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus for correcting a depth map for a three-dimensional image includes an original depth map generating unit for generating an original depth map for frame image data externally supplied to the original depth map generating unit, and a depth map correcting unit for analyzing the externally-supplied frame image data, calculating an image pattern of the frame image data and per-pixel brightness values of the frame image data, based on results of the analysis, and correcting the original depth map output from the original depth map generating unit, based on the calculated image pattern and the calculated brightness values, thereby generating a corrected depth map.

The depth map correcting unit may include a brightness extractor for extracting per-pixel brightness values from the externally-supplied frame image data, an image pattern analyzer for identifying the image pattern of the frame image data, based on the brightness values output from the brightness extractor, and outputting a predetermined pattern gain value, based on results of the identification, a block depth map generator for classifying pixels of the frame image data into n pixel blocks (n being a natural number greater than 1), based on spatial positions of the pixels, calculating an average brightness value of each of the pixel blocks while referring to the brightness values output from the brightness extractor, and correcting the original depth map output from the original depth map generator, based on the average brightness value of each of the pixel blocks and the pattern gain value from the image pattern analyzer, thereby generating a block-based depth map, a pixel depth map generator for correcting the original depth map output from the original depth map generating unit, based on the brightness values from the brightness extractor and the pattern gain value from the image pattern analyzer, thereby generating a pixel-based depth map, and a corrected depth map generator for generating a corrected depth map, based on the block-based depth map from the block depth map generator and the pixel-based depth map from the pixel depth map generator.

The image pattern analyzer may classify the pixels of the frame image data into m pattern blocks (m being a natural number greater than 1), based on the spatial positions of the pixels, may group a part of the m pattern blocks into a sky area while grouping another part of the m pattern blocks into a side area, may calculate an average brightness value of the sky area and an average brightness value of the side area while referring to the brightness values output from the brightness extractor, may identify the image pattern of the frame image data, based on the calculated average brightness values, and may select a pattern gain value, based on results of the identification.

The image pattern analyzer may compare the average brightness value of the sky area with a predetermined reference brightness value, may compare the average brightness value of the side area with the reference brightness value, and may select one pattern gain value from a plurality of predetermined pattern gain values, based on results of the comparison.

The image pattern analyzer may classify the pixels into 9 pattern blocks, may group three horizontally-adjacent pattern blocks spatially arranged at an uppermost side of the pattern blocks into the sky area, and may group two vertically-adjacent pattern blocks spatially arranged at a left edge side of the 9 pattern blocks and two vertically-adjacent pattern blocks spatially arranged at a right edge side of the 9 pattern blocks into the side area.

The image pattern analyzer may recognize that the externally-supplied frame image data has a first image pattern, when the average brightness value of the sky area is lower than or equal to the reference brightness value, and the average brightness value of the side area is higher than the reference brightness value, and then selects a first one of the pattern gain values. The image pattern analyzer may recognize that the externally-supplied frame image data has a second image pattern, when the average brightness value of the sky area is higher than the reference brightness value, and the average brightness value of the side area is lower than or equal to the reference brightness value, and then selects a second one of the pattern gain values. The image pattern analyzer may recognize that the externally-supplied frame image data has a third image pattern, when the average brightness value of the sky area is lower than or equal to the reference brightness value, and the average brightness value of the side area is lower than or equal to the reference brightness value, and then selects a third one of the pattern gain values. The image pattern analyzer may recognize that the externally-supplied frame image data has a fourth image pattern, when the average brightness value of the sky area is higher than the reference brightness value, and the average brightness value of the side area is higher than the reference brightness value, and then selects a fourth one of the pattern gain values.

The first pattern gain value may be 0.3, the second pattern gain value may be 0.7, the third pattern gain value may be 0, and the fourth pattern gain value may be 1.

The block depth map generator may further calculate a first vertical weight for one pixel in each of the pixel blocks, based on a vertical position of the pixel, and may correct the original depth map, based on the average brightness value of the pixel block and the pattern gain value from the image pattern analyzer, and the first vertical weight. The pixel depth map generator may further calculate a second vertical weight for one of the pixels, based on a vertical position of the pixel, and corrects the original depth map, based on the brightness values from the brightness extractor, the pattern gain value from the image pattern analyzer, and the second vertical weight, thereby generating a pixel-based depth map.

The first vertical weight and the second vertical weight may be expressed by the following Expression 1:

$$(HL\_total/60)-(N\_HL\_pxl/60)\times 8 \quad \text{[Expression 1]}$$

where, "HL_total" represents a total number of horizontal lines of a display screen, and "N_HL_pxl" represents a number identifying one horizontal line where a specific one of the pixels is arranged. When the first vertical weight has a decimal value, the first vertical weight may be rounded off to one decimal place.

The block depth map generator may calculate a k-th block gain value for a k-th one of the pixel blocks where a specific one of the pixels is arranged, based on the average brightness value of the k-th pixel block, may calculate a k−1-th block gain value for a k−1-th one of the pixel blocks, which is arranged adjacent to the k-th pixel block at a left side of the k-th pixel block, based on the average brightness value of the k−1-th pixel block, and may calculate a k+1-th block gain value for a k+1-th one of the pixel blocks, which is arranged adjacent to the k-th pixel block at a right side of the k-th pixel block, based on the average brightness value of the k+1-th pixel block. The block depth map generator may define a higher one of the k−1-th and k+1-th block gain values as a side block gain value. The block depth map generator may multiply the k-th block gain value, the side block gain value, the first vertical weight and the pattern gain value to calculate a first total gain value. The block depth map generator may search the original depth map for an original depth value assigned to the specific pixel, and may add the first total gain value to the searched original depth value to calculate a block depth value for the specific pixel. The block depth map generator may execute the block depth value calculation for all of the pixels, thereby generating the block-based depth map.

The k-th block gain value may be expressed by the following Expression 1, the k−1-th block gain value may be expressed by the following Expression 2, and the k+1-th block gain value may be expressed by the following Expression 3:

$$(Max\_th1-bli\_apl\_k)/Max\_th1-Min\_th1), \quad \text{[Expression 1]}$$

$$(Max\_th2-bli\_apl\_k-1)/Max\_th2-Min\_th2), \quad \text{[Expression 2]}$$

and $$(Max\_th2-blk\_apl\_k+1)/Max\_th2-Min\_th2), \quad \text{[Expression 3]}$$

where, "Max_th1" represents a predetermined first maximum reference value, "Min_th1" represents a predetermined first minimum reference value, "Max_th2" represents a predetermined second maximum reference value, "Min_th2" represents a predetermined second minimum reference value, "blk_apl_k" represents an average brightness value of the k-th pixel block, "blk_apl_k−1" represents an average brightness value of the k−1-th pixel block, and "blk_apl_k+1" represents an average brightness value of the k+1-th pixel block.

The first maximum reference value, the first minimum reference value, the second maximum reference value, and the second minimum reference value may be 400, 200, 440, and 240, respectively.

The pixel depth map generator may calculate an i-th pixel gain value for an i-th specific one of the pixels, based on the brightness value of the i-th pixel, may calculate an i−1-th pixel gain value for an i−1-th one of the pixels, which is arranged adjacent to the i-th pixel at a left side of the i-th pixel, based on the brightness value of the i−1-th pixel, and may calculate an i+1-th pixel gain value for the i+1-th one of the pixels, which is arranged adjacent to the i-th pixel at a right side of the i-th pixel, based on the brightness value of the i+1-th pixel. The pixel depth map generator may define a higher one of the i−1-th and i+1-th pixel gain values as a side pixel gain value. The pixel depth map generator may multiply the i-th pixel gain value, the side pixel gain value, the second vertical weight and the pattern gain value to calculate a second total gain value. The pixel depth map generator may search the original depth map for an original depth value assigned to the i-th pixel, and may add the second total gain value to the searched original depth value to calculate a pixel depth value for the i-th pixel. The pixel depth map generator may execute the pixel depth value calculation for all of the pixels, thereby generating the pixel-based depth map.

The i-th pixel gain value may be expressed by the following Expression 1, the i−1-th pixel gain value may be expressed by the following Expression 2, and the i+1-th pixel gain value may be expressed by the following Expression 3:

$$(Max\_th3-pxl\_i)/Max\_th3-Min\_th3), \qquad [\text{Expression 1}]$$

$$(Max\_th4-pxl\_i-1)/Max\_th4-Min\_th4), \qquad [\text{Expression 2}]$$

and $$(Max\_th4-pxl\_i+1)/Max\_th4-Min\_th4), \qquad [\text{Expression 3}]$$

where, "Max_th3" represents a predetermined third maximum reference value, "Min_th3" represents a predetermined third minimum reference value, Max_th4" represents a predetermined fourth maximum reference value, "Min_th4" represents a predetermined fourth minimum reference value, "pxl_i" represents a brightness value of the i-th pixel, "pxl_i−1" represents a brightness value of the i−1-th pixel, and "pxl_i+1" represents a brightness value of the i+1-th pixel.

The third maximum reference value, the third minimum reference value, the fourth maximum reference value, and the fourth minimum reference value may be 250, 170, 290, and 210, respectively.

The corrected depth map generator may search the block-based depth map for a block depth value assigned to the specific pixel, may search the pixel-based depth map for a pixel depth value assigned to the specific pixel, may multiply the searched block depth value by a first correction gain value to calculate a corrected block depth value, may multiply the searched pixel depth value by a second correction gain value to calculate a corrected pixel depth value, may sum the corrected block depth value and the corrected pixel depth value to calculate a corrected depth value for the specific pixel, and may execute the corrected depth value calculation for all of the pixels, thereby generating the corrected depth map.

The sum of the corrected block depth value and the corrected pixel depth value may be 1.

The first correction gain value may be 0.7, and the second correction gain value may be 0.3.

In another aspect of the present invention, a method for correcting a depth map for a three-dimensional image includes the steps of: A) generating an original depth map for frame image data externally supplied, and B) analyzing the externally-supplied frame image data, calculating an image pattern of the frame image data and per-pixel brightness values of the frame image data, based on results of the analysis, and correcting the original depth map, based on the calculated image pattern and the calculated brightness values, thereby generating a corrected depth map.

The step B may include B-a) extracting per-pixel brightness values from the externally-supplied frame image data, B-b) identifying the image pattern of the frame image data, based on the brightness values, and outputting a predetermined pattern gain value, based on results of the identification, B-c) classifying pixels of the frame image data into n pixel blocks (n being a natural number greater than 1), based on spatial positions of the pixels, calculating an average brightness value of each of the pixel blocks while referring to the brightness values, and correcting the original depth map, based on the average brightness value of each of the pixel blocks and the pattern gain value, thereby generating a block-based depth map, B-d) correcting the original depth map, based on the brightness values and the pattern gain value, thereby generating a pixel-based depth map, and B-e) generating a corrected depth map, based on the block-based depth map and the pixel-based depth map.

The step B-b may include classifying the pixels of the frame image data into m pattern blocks (m being a natural number greater than 1), based on the spatial positions of the pixels, grouping a part of the m pattern blocks into a sky area while grouping another part of the m pattern blocks into a side area, calculating an average brightness value of the sky area and an average brightness value of the side area while referring to the brightness values, identifying the image pattern of the frame image data, based on the calculated average brightness values, and selecting a pattern gain value, based on results of the identification.

The step B-b may include comparing the average brightness value of the sky area with a predetermined reference brightness value, comparing the average brightness value of the side area with the reference brightness value, and selecting one pattern gain value from a plurality of predetermined pattern gain values, based on results of the comparison.

The step B-b may include classifying the pixels into 9 pattern blocks, grouping three horizontally-adjacent pattern blocks spatially arranged at an uppermost side of the pattern blocks into the sky area, and grouping two vertically-adjacent pattern blocks spatially arranged at a left edge side of the 9 pattern blocks and two vertically-adjacent pattern blocks spatially arranged at a right edge side of the 9 pattern blocks into the side area.

The step B-b may include recognizing that the externally-supplied frame image data has a first image pattern, when the average brightness value of the sky area is lower than or equal to the reference brightness value, and the average brightness value of the side area is higher than the reference brightness value, and then selecting a first one of the pattern gain values. The step B-b may further include recognizing that the externally-supplied frame image data has a second image pattern, when the average brightness value of the sky area is higher than the reference brightness value, and the average brightness value of the side area is lower than or equal to the reference brightness value, and then selecting a second one of the pattern gain values. The step B-b may further include recognizing that the externally-supplied frame image data has a third image pattern, when the average brightness value of the sky area is lower than or equal to the reference brightness value, and the average brightness value of the side area is lower than or equal to the reference brightness value, and then selecting a third one of the pattern gain values. The step B-b may further include recognizing that the externally-supplied frame image data has a fourth image pattern, when the average brightness value of the sky area is higher than the reference brightness value, and the average brightness value of the side area is higher than the reference brightness value, and then selecting a fourth one of the pattern gain values.

The first pattern gain value may be 0.3, the second pattern gain value may be 0.7, the third pattern gain value may be 0, and the fourth pattern gain value may be 1.

The step B-c may further include calculating a first vertical weight for one pixel in each of the pixel blocks, based on a vertical position of the pixel, and correcting the original depth map, based on the average brightness value of the pixel block and the pattern gain value from the image pattern analyzer, and the first vertical weight. The step B-d may further include calculating a second vertical weight for one of the pixels, based on a vertical position of the pixel, and correcting the original depth map, based on the brightness values from the brightness extractor, the pattern gain value from the image pattern analyzer, and the second vertical weight, thereby generating a pixel-based depth map.

The first vertical weight and the second vertical weight may be expressed by the following Expression 1:

(HL_total/60)−(N_HL_pxl/60)×8  [Expression 1]

where, "HL_total" represents a total number of horizontal lines of a display screen, and "N_HL_pxl" represents a number identifying one horizontal line where a specific one of the pixels is arranged. When the first vertical weight has a decimal value, the first vertical weight may be rounded off to one decimal place.

The step B-c may include calculating a k-th block gain value for a k-th one of the pixel blocks where a specific one of the pixels is arranged, based on the average brightness value of the k-th pixel block, calculating a k−1-th block gain value for a k−1-th one of the pixel blocks, which is arranged adjacent to the k-th pixel block at a left side of the k-th pixel block, based on the average brightness value of the k−1-th pixel block, and calculating a k+1-th block gain value for a k+1-th one of the pixel blocks, which is arranged adjacent to the k-th pixel block at a right side of the k-th pixel block, based on the average brightness value of the k+1-th pixel block, defining a higher one of the k−1-th and k+1-th block gain values as a side block gain value, multiplying the k-th block gain value, the side block gain value, the first vertical weight and the pattern gain value to calculate a first total gain value, searching the original depth map for an original depth value assigned to the specific pixel, and adding the first total gain value to the searched original depth value to calculate a block depth value for the specific pixel, and executing the block depth value calculation for all of the pixels, thereby generating the block-based depth map.

The k-th block gain value may be expressed by the following Expression 1, the k−1-th block gain value may be expressed by the following Expression 2, and the k+1-th block gain value may be expressed by the following Expression 3:

(Max_th1−bli_apl_k)/Max_th1−Min_th1),  [Expression 1]

(Max_th2−bli_apl_k−1)/Max_th2−Min_th2),  [Expression 2]

and (Max_th2−blk_apl_k+1)/Max_th2−Min_th2),  [Expression 3]

where, "Max_th1" represents a predetermined first maximum reference value, "Min_th1" represents a predetermined first minimum reference value, "Max_th2" represents a predetermined second maximum reference value, "Min_th2" represents a predetermined second minimum reference value, "blk_apl_k" represents an average brightness value of the k-th pixel block, "blk_apl_k−1" represents an average brightness value of the k−1-th pixel block, and "blk_apl_k+1" represents an average brightness value of the k+1-th pixel block.

The first maximum reference value, the first minimum reference value, the second maximum reference value, and the second minimum reference value may be 400, 200, 440, and 240, respectively.

The step B-d may include calculating an i-th pixel gain value for an i-th specific one of the pixels, based on the brightness value of the i-th pixel, calculating an i−1-th pixel gain value for an i−1-th one of the pixels, which is arranged adjacent to the i-th pixel at a left side of the i-th pixel, based on the brightness value of the i−1-th pixel, and calculating an i+1-th pixel gain value for the i+1-th one of the pixels, which is arranged adjacent to the i-th pixel at a right side of the i-th pixel, based on the brightness value of the i+1-th pixel, defining a higher one of the i−1-th and i+1-th pixel gain values as a side pixel gain value, multiplying the i-th pixel gain value, the side pixel gain value, the second vertical weight and the pattern gain value to calculate a second total gain value, searching the original depth map for an original depth value assigned to the i-th pixel, and adding the second total gain value to the searched original depth value to calculate a pixel depth value for the i-th pixel, and executing the pixel depth value calculation for all of the pixels, thereby generating the pixel-based depth map.

The i-th pixel gain value may be expressed by the following Expression 1, the i−1-th pixel gain value may be expressed by the following Expression 2, and the i+1-th pixel gain value may be expressed by the following Expression 3:

(Max_th3−pxl_i)/Max_th3−Min_th3),  [Expression 1]

(Max_th4−pxl_i−1)/Max_th4−Min_th4),  [Expression 2]

and (Max_th4−pxl_i+1)/Max_th4−Min_th4),  [Expression 3]

where, "Max_th3" represents a predetermined third maximum reference value, "Min_th3" represents a predetermined third minimum reference value, Max_th4" represents a predetermined fourth maximum reference value, "Min_th4" represents a predetermined fourth minimum reference value, "pxl_i" represents a brightness value of the i-th pixel, "pxl_i−1" represents a brightness value of the i−1-th pixel, and "pxl_i+1" represents a brightness value of the i+1-th pixel.

The third maximum reference value, the third minimum reference value, the fourth maximum reference value, and the fourth minimum reference value may be 250, 170, 290, and 210, respectively.

The step B-e may include searching the block-based depth map for a block depth value assigned to the specific pixel, searching the pixel-based depth map for a pixel depth value assigned to the specific pixel, multiplying the searched block depth value by a first correction gain value to calculate a corrected block depth value, multiplying the searched pixel depth value by a second correction gain value to calculate a corrected pixel depth value, summing the corrected block depth value and the corrected pixel depth value to calculate a corrected depth value for the specific pixel, and executing the corrected depth value calculation for all of the pixels, thereby generating the corrected depth map.

The sum of the corrected block depth value and the corrected pixel depth value may be 1.

The first correction gain value may be 0.7, and the second correction gain value may be 0.3.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and along with the description serve to explain the principle of the invention. In the drawings:

FIG. 3 is a diagram illustrating kinds of image patterns;

FIGS. 9 to 11 are views explaining effects of the three-dimensional image depth map generating apparatus according to an exemplary embodiment of the present invention.

DETAILED DESCRIPTION OF THE INVENTION

Reference will now be made in detail to the preferred embodiments of the present invention, examples of which are illustrated in the accompanying drawings.

Figure 1:
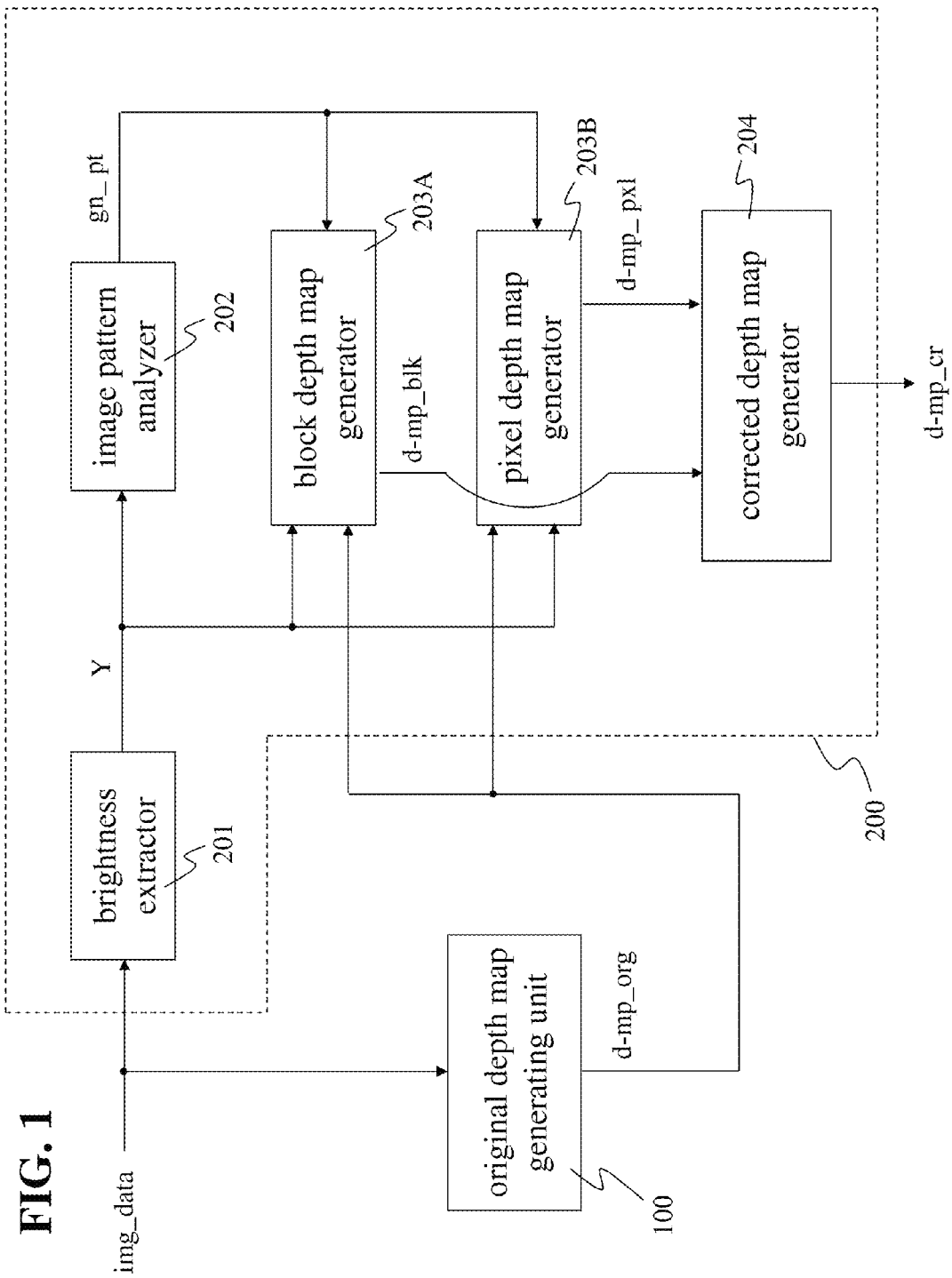
FIG. 1 is a block diagram illustrating an apparatus for correcting a depth map for a three-dimensional image in accordance with an exemplary embodiment of the present invention.

FIG. 1 is a block diagram illustrating an apparatus for correcting a depth map for a three-dimensional image in accordance with an exemplary embodiment of the present invention.

As illustrated in FIG. 1, the depth map correction apparatus according to the illustrated embodiment of the present invention includes an original depth map generating unit 100, and a depth map correcting unit 200.

The original depth map generating unit 100 generates an original depth map d-mp_org for frame image data img_data externally supplied thereto. The frame image data img_data is data of a two-dimensional image of one frame. The original depth map generating unit 100 analyzes the frame image data img_data, thereby determining three-dimensional distance differences among subjects included in the image. Based on the determined results, the original depth map generating unit 100 renders a relatively forwardly protruded subject by a relatively high brightness value (grayscale level corresponding to a bright level) while rendering a relatively backwardly caved subject by a relatively low brightness value (low grayscale level corresponding to a dark level). That is, information as to three-dimensional distance differences among such subjects is rendered in the original depth map d-mp_org, as depth values. The original depth map generating unit 100 determines three-dimensional distances of the above described subjects, based on statistical brightness and color characteristics of the image. For example, a subject exhibiting high brightness in the image is assigned a statistically high depth value, and a subject exhibiting color closer to red is assigned a higher depth value. On the other hand, a subject exhibiting color closer to blue is assigned a lower depth value. Per-pixel depth values (original depth values) are stored in the original depth map d-mp_org.

The depth map correcting unit 200 analyzes the frame image data img_data externally supplied thereto to identify a pattern of the image and calculate per-pixel brightness values of the image. Based on the identified pattern and the calculated brightness values of the image, the depth map correcting unit 200 corrects the original depth map d-mp_org output from the original depth map generating unit 100. The map obtained through correction of the original depth map d-mp_org by the depth map correcting unit 200 is a corrected depth map d-mp_cr.

An image may have characteristics that a subject exhibiting dark color (for example, black) is arranged ahead of a subject exhibiting light color (for example, white). A depth map for such an image may have a high possibility that the depth map cannot accurately render the original characteristics of the image. This is because the original depth map generating unit 100 may erroneously determine that the light-color subject is arranged at a front side, and the dark-color subject is arranged at a side behind the light-color subject and, as such, may generate a depth map having erroneous information. To this end, the depth map correcting unit 200 according to the illustrated embodiment of the present invention identifies the above described characteristics of the image, and corrects the original depth map d-mp_org, based on the identified results. Thus, it may be possible to generate a depth map having more accurate three-dimensional image information.

For this function, as illustrated in FIG. 1, the depth map correcting unit 200 may include a brightness extractor 201, an image pattern analyzer 202, a block depth map generator 203A, a pixel depth map generator 203B, and a corrected depth map generator 204. Hereinafter, these constituent elements will be described in detail.

Brightness Extractor 201

The brightness extractor 201 extracts per-pixel brightness values from the frame image data img_data externally supplied thereto. The frame image data img_data includes pixel data corresponding to the entirety of pixels constituting one frame. The pixel data is classified into red data, green data, and blue data. The brightness extractor 201 separates data of each pixel included in image data of one frame into a brightness component Y and a chrominance component UV, and selectively extracts the brightness component Y. The extracted brightness component Y is a brightness value Y of the associated pixel data. Thus, the brightness extractor 201 extracts the brightness value of each pixel from image data of one frame.

Meanwhile, chrominance data (one of red data, green data, and blue data) may have a size of 8 bits. Each brightness value may have a size of 10 bits. Meanwhile, the per-pixel depth value of the above described original depth map d-mp_org may have a size of 8 bits.

Image Pattern Analyzer 202

The image pattern analyzer 202 identifies an image pattern of the frame image data img_data, based on brightness values Y output from the brightness extractor 201, and outputs one of predetermined pattern gain values gn_pt, based on the identified results.

In detail, the image pattern analyzer 202 classifies pixels of the frame image data img_data into m pattern blocks (m being a natural number greater than 1), based on spatial positions of the pixels. That is, when a display screen ("DSP" in FIG. 2), on which the frame image is displayed, is divided into m pattern blocks, each pixel of the frame image belongs to an associated one of the m pattern blocks. The image pattern analyzer 202 then groups a part of the m pattern blocks into one group, namely, a sky area ("SK" in FIG. 2), while grouping another part of the m pattern blocks into another group, namely, a side area ("SD" in FIG. 2). Subsequently, the image pattern analyzer 202 calculates an average brightness value of the sky area SK and an average brightness value of the side area SD while referring to the brightness values output from the brightness extractor 201. Based on the calculated average brightness values, the image pattern analyzer 202 may identify the image pattern of the frame image, and may select one pattern gain value gn_pt, based on the identified results. In this case, the image pattern analyzer 202 may select one pattern gain value from a plurality of predetermined pattern gain values, based on results of a comparison between the average brightness value of the sky area SK and a predetermined reference brightness value and results of a comparison between the average brightness value of the side area SD and the predetermined reference brightness value. Such operation of the image pattern analyzer 202 will be described in more detail with reference to FIG. 2.

Figure 2:
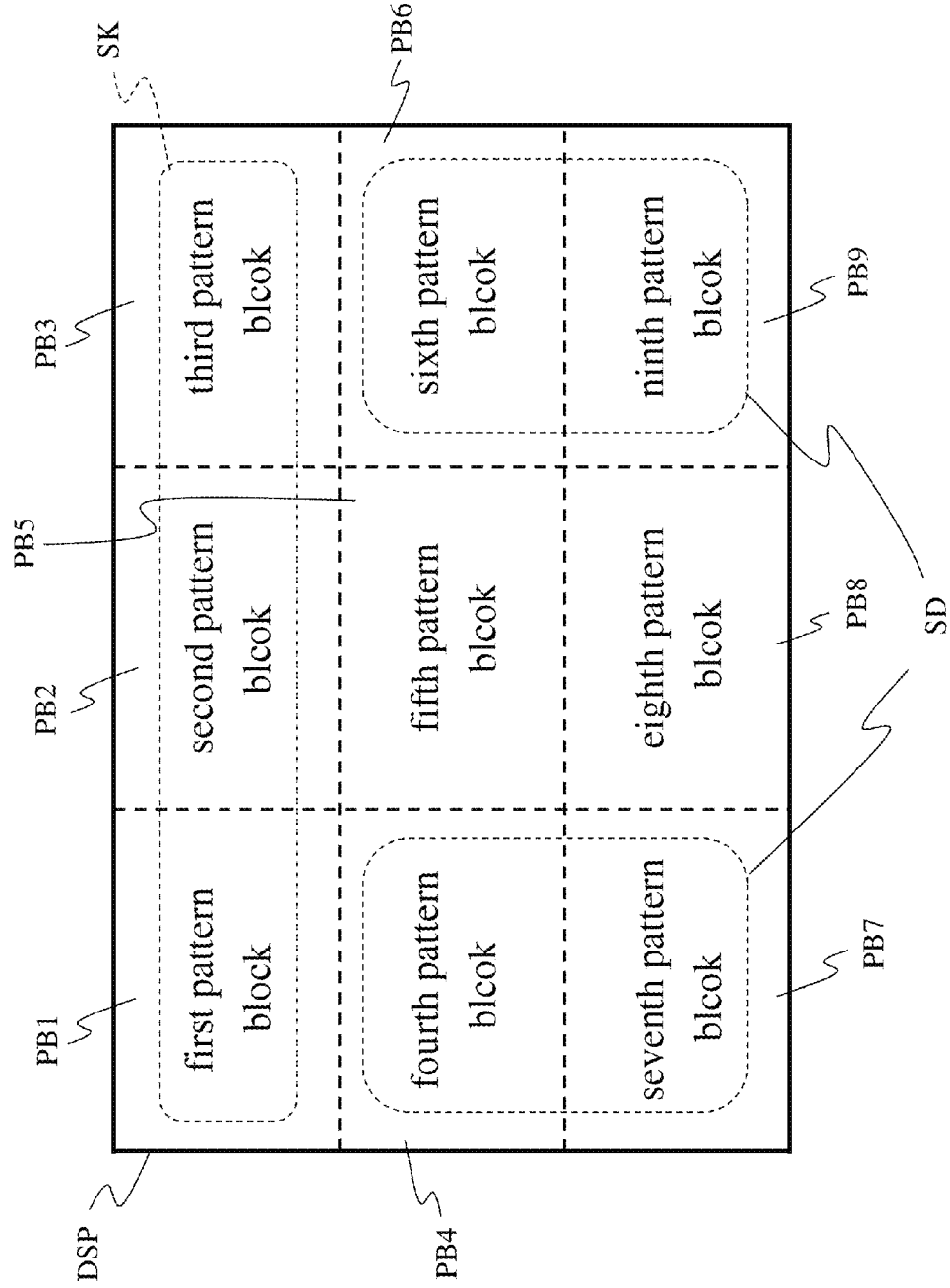
FIG. 2 is a diagram explaining operation of an image pattern analyzer illustrated in FIG. 1.

FIG. 2 is a diagram explaining operation of the image pattern analyzer 202 illustrated in FIG. 1.

As illustrated in FIG. 2, the image pattern analyzer 202 may classify all pixels of a frame image into 9 pattern blocks PB1 to PB9.

The image pattern analyzer 202 groups, into a sky area SK, three horizontally-adjacent pattern blocks PB1, PB2, and PB3 spatially arranged at an uppermost side of the 9 pattern blocks PB1 to PB9. For example, the first pattern block PB1, second pattern block PB2, and third pattern block PB3 are grouped to constitute one sky area SK.

The image pattern analyzer 202 also groups, into a side area SD, two vertically-adjacent pattern blocks PB4 and PB7 spatially arranged at a left edge side of the 9 pattern blocks PB1 to PB9 and two vertically-adjacent pattern blocks PB6 and PB9 spatially arranged at a right edge side of the 9 pattern blocks PB1 to PB9. For example, the fourth pattern block PB4, seventh pattern block BPB7, sixth pattern block PB6, and ninth pattern block PB9 are grouped to constitute one side area SD.

The image pattern analyzer 202 analyzes an image pattern of the frame image, based on an average brightness value of the sky area SK and an average brightness value of the side area SD. For example, the image pattern analyzer 202 sums the brightness values of all pixels arranged in the sky area SK to calculate the total brightness value of the sky area SK. The image pattern analyzer 202 then divides the total brightness value by the number of all pixels in the sky area SK, thereby deriving an average brightness value of the sky area SK. Similarly, the image pattern analyzer 202 sums the brightness values of all pixels arranged in the side area SD to calculate the total brightness value of the side area SD. The image pattern analyzer 202 then divides the total brightness value by the number of all pixels in the side area SD, thereby deriving an average brightness value of the side area SD.

Thereafter, the image pattern analyzer 202 compares the average brightness value of the sky area SK with a reference brightness value, and compares the average brightness value of the side area SD with the reference brightness value. Based on the compared results, the image pattern analyzer 202 determines the image pattern of the frame image. The image pattern of the frame image may be one of four image patterns illustrated in FIG. 3.

FIG. 3 is a diagram illustrating kinds of image patterns.

FIG. 3(a) is a diagram illustrating a first image pattern. The first image pattern is an image pattern in case where the average brightness value of the sky area SK (the area constituted by the pattern blocks PB1 to PB3) is lower than or equal to the reference brightness value, and the average brightness value of the side area SD (the area constituted by the pattern blocks PB4, PB7, PB6, and PB9) is higher than the reference brightness value. When the externally input frame image data img_data exhibits the characteristics of the first image pattern as illustrated in FIG. 3(a), the image pattern analyzer 202 selects and outputs a first pattern gain value.

FIG. 3(b) is a diagram illustrating a second image pattern. The second image pattern is an image pattern in case where the average brightness value of the sky area SK is higher than the reference brightness value, and the average brightness value of the side area SD is lower than or equal to the reference brightness value. When the externally input frame image data img_data exhibits the characteristics of the second image pattern as illustrated in FIG. 3(b), the image pattern analyzer 202 selects and outputs a second pattern gain value.

FIG. 3(c) is a diagram illustrating a third image pattern. The third image pattern is an image pattern in case where the average brightness value of the sky area SK is lower than or equal to the reference brightness value, and the average brightness value of the side area SD is also lower than or equal to the reference brightness value. When the externally input frame image data img_data exhibits the characteristics of the third image pattern as illustrated in FIG. 3(c), the image pattern analyzer 202 selects and outputs a third pattern gain value.

FIG. 3(d) is a diagram illustrating a fourth image pattern. The fourth image pattern is an image pattern in case where the average brightness value of the sky area SK is higher than the reference brightness value, and the average brightness value of the side area SD is higher than the reference brightness value. When the externally input frame image data img_data exhibits the characteristics of the fourth image pattern as illustrated in FIG. 3(d), the image pattern analyzer 202 selects and outputs a fourth pattern gain value.

The above described reference brightness value may be set to 300 or 400.

The above described first to fourth pattern gain values are predetermined, and may be 0 to 1. For example, the first pattern gain value may be set to 0.3, the second pattern gain value may be set to 0.7, the third pattern gain value may be set to 0, and the fourth pattern gain value may be set to 1.

Block Depth Map Generator 203A

Figure 4:
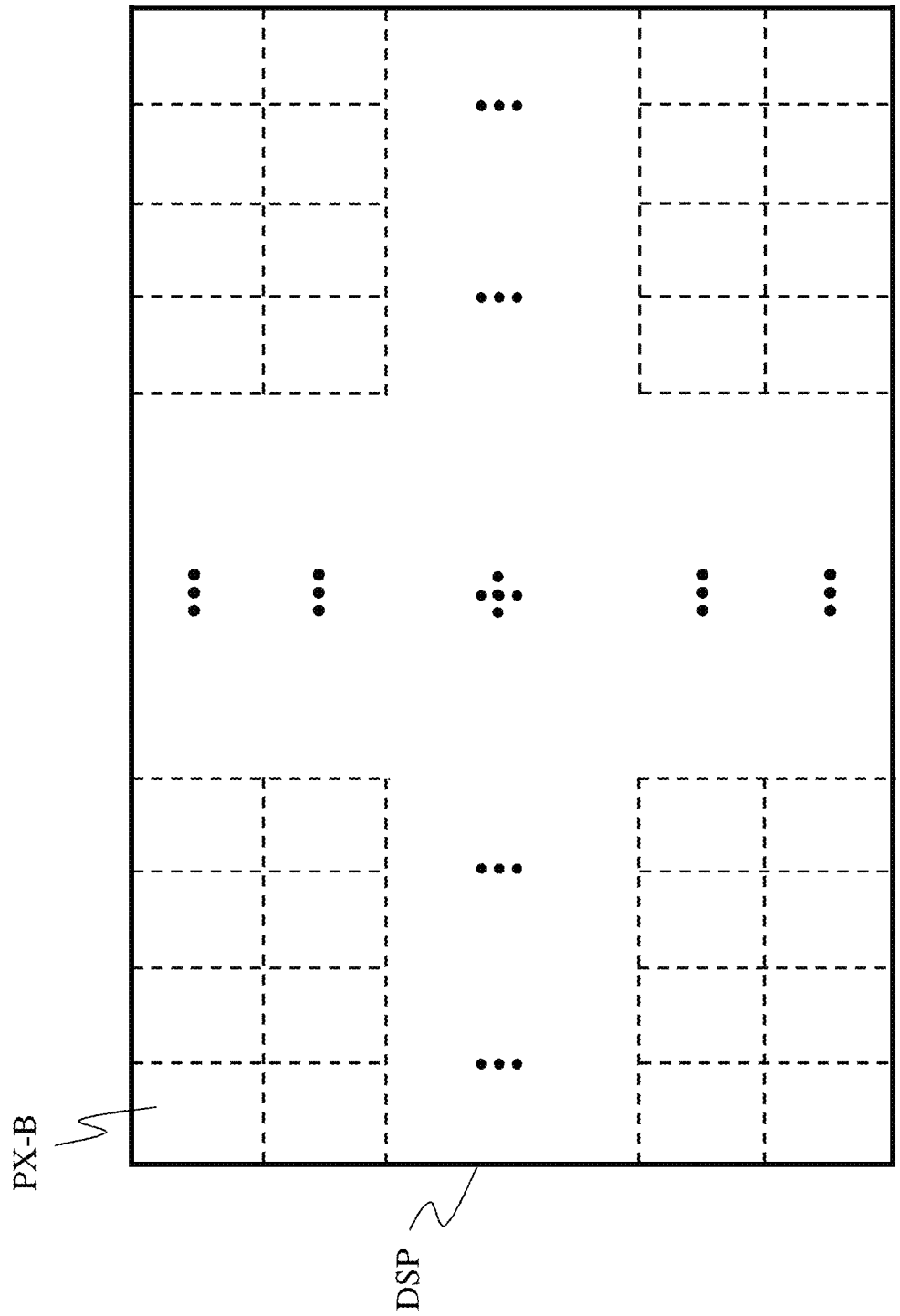
FIG. 4 is a diagram explaining pixel blocks.

FIG. 4 is a diagram explaining pixel blocks.

As illustrated in FIG. 4, the block depth map generator 203A classifies pixels of a frame image into n pixel blocks (n being a natural number greater than 1), based on spatial positions of the pixels. That is, when the display screen DSP, on which the frame image is displayed, is divided into n pixel blocks PX-B, each pixel of the frame image belongs to an associated one of the n pixel blocks PX-B. The block depth map generator 203A then calculates an average brightness value of each pixel block PX-B while referring to brightness values Y output from the brightness extractor 201. Based on the average brightness value of each pixel block PX-B and the pattern gain value gn_pt from the image pattern analyzer 202, the block depth map generator 203A corrects the original depth map d-mp_org output from the original depth map generator 100, thereby generating a block-based depth map d-mp_blk.

Meanwhile, the block depth map generator 203A may further calculate a first vertical weight value for one pixel in each pixel block PX-B, based on a vertical position of the pixel. In this case, the block depth map generator 203A corrects the original depth map d-mp_org, based on the first vertical weight value, in addition to the average brightness value of each pixel block PX-B and the pattern gain value gn_pt.

Hereinafter, such operation of the block depth map generator 203A will be described in detail with reference to FIG. 5.

Figure 5:
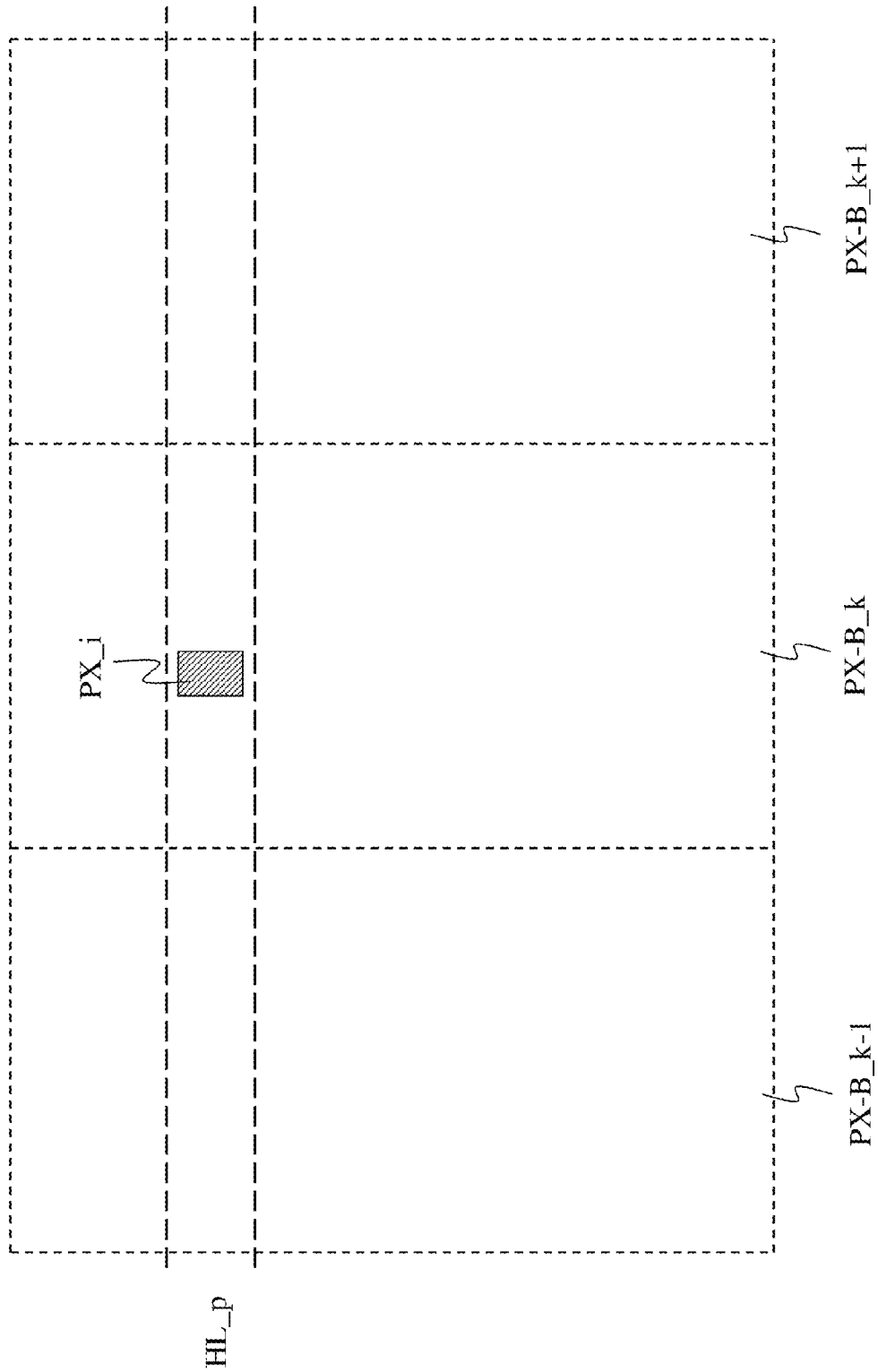
FIG. 5 is a diagram illustrating a part of the pixel blocks illustrated in FIG. 4.

FIG. 5 is a diagram illustrating a part of the pixel blocks illustrated in FIG. 4.

The block depth map generator 203A calculates block depth values of all pixels, thereby generating a block-based depth map d-mp_blk. First, calculation of a block depth value for one specific pixel PX_i will be described.

Referring to FIG. 5, three adjacent pixel blocks PX-B_k−1 to PX-B_k+1 are illustrated. In this case, it is assumed that the specific pixel PX_i is arranged in the k-th pixel block PX-B_k.

In this case, the block depth map generator 203A calculates an average brightness value of the k-th pixel block PX-B_k where the specific pixel PX_i is arranged. Based on the calculated average brightness value, the block depth map generator 203A calculates a k-th block gain value for the k-th pixel block PX-B_k. The block depth map generator 203A also calculates an average brightness value of the k−1-th pixel block PX-B_k−1, and calculates a k−1-th block gain value for the k−1-th pixel block PX-B_k−1, based on the average brightness value of the k−1-th pixel block PX-B_k−1. In addition, the block depth map generator 203A calculates an average brightness value of the k+1-th pixel block PX-B_k+1, and calculates a k+1-th block gain value for the k+1-th pixel block PX-B_k+1, based on the average brightness value of the k+1-th pixel block PX-B_k+1.

The k-th block gain value for the k-th pixel block PX-B_k where the specific pixel PX_i is arranged is expressed by the following Expression 1.

$$(\text{Max\_th1} - \text{blk\_apl\_k})/\text{Max\_th1} - \text{Min\_th1}) \qquad [\text{Expression 1}]$$

In Expression 1, "Max_th1" represents a predetermined first maximum reference value, "Min_th1" represents a predetermined first minimum reference value, and "blk_apl_k" represents an average brightness value of the k-th pixel block PX-B_k. In this case, the first maximum may be set to 400, and the first minimum reference value may be set to 200. Meanwhile, the average brightness value of the k-th pixel block PX-B_k is a value obtained by summing the brightness values of all pixels arranged in the k-th pixel block BX-B_k, and then dividing the summed brightness value by the number of the pixels arranged in the k-th pixel block BX-B_k.

The k−1-th block gain value for the k−1-th pixel block PX-B_k−1 arranged adjacent to the k-th pixel block PX-B_x at a left side of the k-th pixel block PX-B_x is expressed by the following Expression 2.

$$(\text{Max\_th2} - \text{blk\_apl\_k} - 1)/\text{Max\_th2} - \text{Min\_th2}) \qquad [\text{Expression 2}]$$

In Expression 2, "Max_th2" represents a predetermined second maximum reference value, "Min_th2" represents a predetermined second minimum reference value, and "blk_apl_k−1" represents an average brightness value of the k−1-th pixel block PX-B_k−1. In this case, the second maximum reference value may be set to 440, and the second minimum reference value may be set to 240. Meanwhile, the average brightness value of the k−1-th pixel block PX-B_k−1 is a value obtained by summing the brightness values of all pixels arranged in the k−1-th pixel block BX-B_k−1, and then dividing the summed brightness value by the number of the pixels arranged in the k−1-th pixel block BX-B_k−1.

The k+1-th block gain value for the k+1-th pixel block PX-B_k+1 arranged adjacent to the k-th pixel block PX-B_x at a right side of the k-th pixel block PX-B_x is expressed by the following Expression 3.

$$(\text{Max\_th2} - \text{blk\_apl\_k} + 1)/\text{Max\_th2} - \text{Min\_th2}) \qquad [\text{Expression 3}]$$

In Expression 3, "Max_th2" represents the predetermined second maximum reference value, "Min_th2" represents the predetermined second minimum reference value, and "blk_apl_k+1" represents an average brightness value of the k+1-th pixel block PX-B_k+1. In this case, the average brightness value of the k+1-th pixel block PX-B_k+1 is a value obtained by summing the brightness values of all pixels arranged in the k+1-th pixel block BX-B_k+1, and then dividing the summed brightness value by the number of the pixels arranged in the k+1-th pixel block BX-B_k+1.

After calculation of the k-th block gain value, k−1-th block gain value, and k+1-th block gain value, the block depth map generator 203A selects a higher one of the k−1-th block gain value and k+1-th block gain value, and defines the selected block gain value as a side block gain value. The block depth map generator 203A then multiplies the k-th block gain value, side block gain value, first vertical weight value and pattern gain value to calculate a first total gain value.

In this case, the first vertical weight is expressed by the following Expression 4.

$$(\text{HL\_total}/60) - (\text{N\_HL\_pxl}/60) \times 8 \qquad [\text{Expression 4}]$$

In Expression 4, "HL_total" represents the total number of horizontal lines of the display screen DSP, and "N_HL_pxl" represents a number of the horizontal line where a specific pixel PX_i is arranged. For example, when the three-dimensional image depth map generating apparatus according to the present invention is applied to a full high definition (FHD) display device having a resolution of 1080×960, "HL_total" is 1080. In this case, the horizontal line arranged at the uppermost of the display screen DSP is a first horizontal line, whereas the horizontal line arranged at the lowermost of the display screen DSP is a 1080-th horizontal line. "N_HL_pxl" represents a number of the horizontal line where the specific pixel PX_i is arranged. For example, when the specific pixel PX_i is arranged on the p-th horizontal line HL_p (p being a natural number of 1 to 1080), the value of "N_HL_pxl" is p.

The first vertical weight value is set in accordance with a statistical basis that an image displayed on a lower portion of the display screen DSP is further protruded than an image displayed on an upper portion of the display screen DSP. Accordingly, the lower the horizontal line of the display screen DSP where the specific pixel PX_i is arranged, the higher the first vertical weight value of the specific pixel PX_i. Meanwhile, when the first vertical weight value has a decimal value, it is rounded off to one decimal place. In an FHD display device, accordingly, the first vertical weight value thereof may have a value which is a natural number of 8 to 144.

Thereafter, the block depth map generator 203A searches the original depth map d-mp_org for an original depth value assigned to the specific pixel PX_i. The block depth map generator 203A then adds the first total gain value to the searched original depth value to calculate a block depth value for the specific pixel PX_i.

That is, the block depth value for the specific pixel PX_i is expressed by the following Expression 5.

$$\text{Original Depth Value} + (\text{First Vertical Weight Value} \times \text{k-th Block Gain Value} \times \text{Side Block Gain Value} \times \text{Pattern Gain Value}) \qquad [\text{Expression 5}]$$

In order to derive the block depth value for the specific pixel PX_i, the block gain value obtained from the pixel block where the specific pixel PX_i is arranged (k-th pixel block PX-B_k), the side block gain value obtained from two pixel blocks arranged adjacent to the pixel block PX-B_k at the left and right sides of the pixel block PX-B_k (k−1-th pixel block PX-B_k−1 and k+1-th pixel block PX-B_k+1), the first vertical weight value obtained from the vertical position of the specific pixel PX_i, and the original depth value corresponding to the specific pixel PX_i are needed.

The block depth map generator 203A calculates a block depth value for each of the remaining pixels in the above described manner, based on the pixel block where the pixel is arranged. Accordingly, pixels arranged in the same pixel block and on the same horizontal line have the same block depth value.

However, when the pixel block where the specific pixel is arranged is positioned at the left edge or right edge of the display screen DSP, the side block gain value in this case is obtained from one adjacent pixel block. For example, when the specific pixel, for which a block depth value is to be derived, is arranged in a pixel block positioned at the left end of the display screen DSP (hereinafter, referred to as a "specific pixel block"), the gain value obtained from the pixel block arranged adjacent to the specific pixel block at the right side of the specific pixel block is used as the side block gain value because there is no pixel block arranged at the left side of the specific pixel block. On the other hand, when the specific pixel block is positioned at the right end of the display screen DSP, the gain value obtained from the pixel block arranged adjacent to the specific pixel block at the left side of the specific pixel block is used as the side block gain value because there is no pixel block arranged at the right side of the specific pixel block.

When the block depth values for all pixels are calculated in the above described manner, a block-based depth map d-mp_blk based on the block depth values is generated.

Meanwhile, the above described k-th block gain value, k−1-th block gain value, k+1-th block gain value, and first vertical weight value may have negative values, respectively. Negative values are converted into zeros. That is, the above described values cannot be smaller than 0.

Pixel Depth Map Generator 203B

The pixel depth map generator 203B corrects the original depth map d-mp_org output from the original depth map generating unit 100, based on the brightness values Y from the brightness extractor 201 and the pattern gain value gn_pt from the image pattern analyzer 202.

Meanwhile, the pixel depth map generator 203B may further calculate a second vertical weight value for one of the pixels, based on the vertical position of the pixel. In this case, the pixel depth map generator 203B corrects the original depth map d-mp_org, based on the brightness values Y, pattern gain value gn_pt, and second vertical weight value, thereby generating a pixel-based depth map d-mp_pxl.

Hereinafter, such operation of the pixel depth map generator 203B will be described in detail with reference to FIG. 6.

Figure 6:
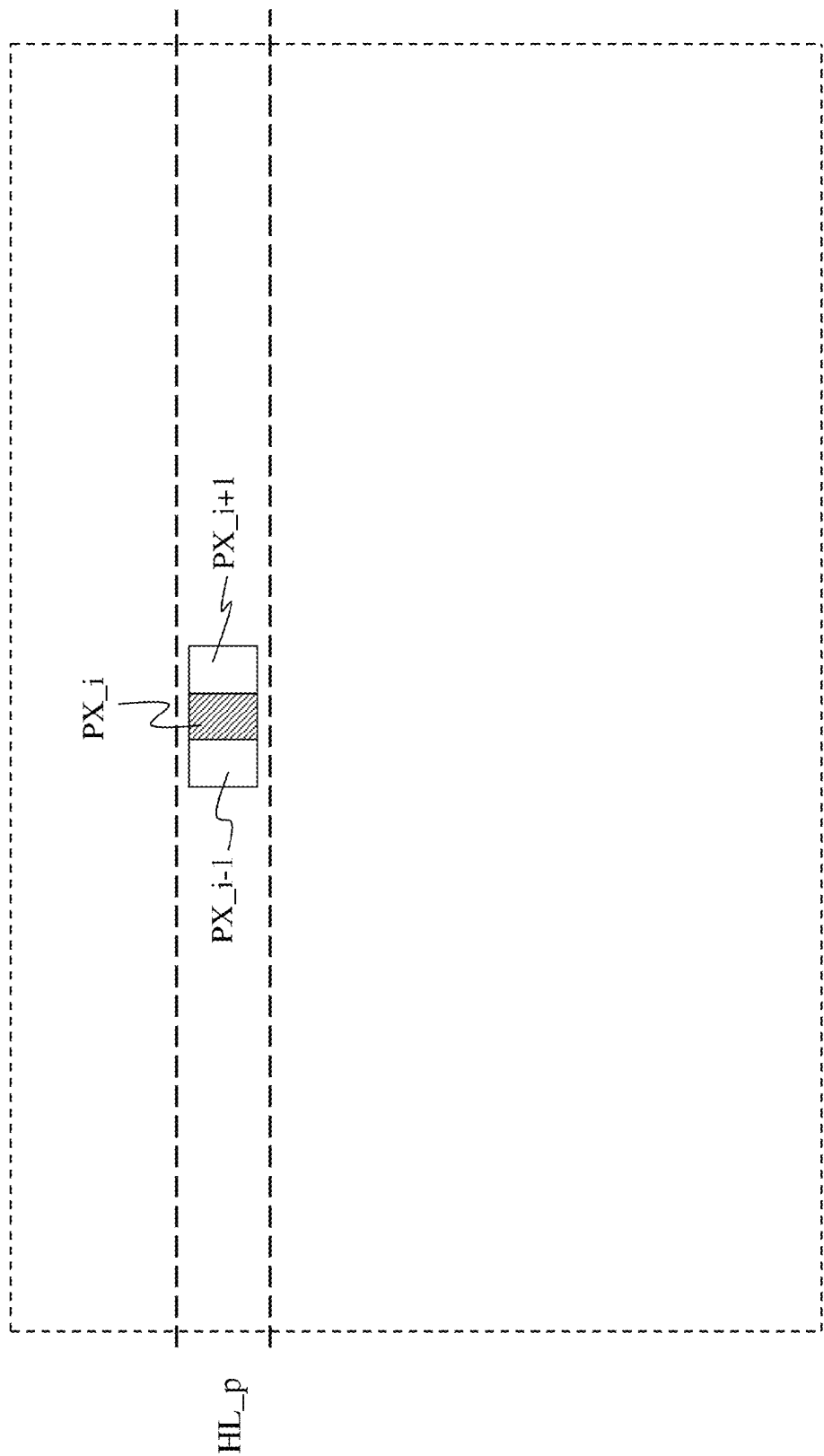
FIG. 6 is a diagram illustrating a part of a display screen corresponding to the pixel blocks illustrated in FIG. 4.

FIG. 6 is a diagram illustrating a part of the display screen corresponding to the pixel blocks illustrated in FIG. 4.

The pixel depth map generator 203B calculates pixel depth values of all pixels, thereby generating a pixel-based depth map d-mp_pxl. First, calculation of a pixel depth value for one specific pixel PX_i will be described. The specific pixel PX_i is identical to the specific pixel PX_i illustrated in FIG. 5 and, as such, will be referred to as an "i-th pixel PX_i".

Referring to FIG. 6, three adjacent pixels are illustrated. In this case, an intermediate one of the three adjacent pixels is the i-th pixel PX_i.

In this case, the pixel depth map generator 203B calculates an i-th pixel gain value for the i-th pixel PX_i, based on the brightness value of the i-th pixel PX_i. The pixel depth map generator 203B also calculates an i−1-th pixel gain value for the i−1-th pixel PX_i, based on the brightness value of the i−1-th pixel PX_i while calculating an i+1-th pixel gain value for the i+1-th pixel PX_i, based on the brightness value of the i+1-th pixel PX_i.

The i-th pixel gain value for the specific pixel PX_i is expressed by the following Expression 6.

$$(\text{Max\_th3} - \text{pxl\_i}) / \text{Max\_th3} - \text{Min\_th3}) \qquad [\text{Expression 6}]$$

In Expression 6, "Max_th3" represents a predetermined third maximum reference value, "Min_th3" represents a predetermined third minimum reference value, and "pxl_i" represents a brightness value of the i-th pixel PX_i. In this case, the third maximum reference value may be set to 250, and the third minimum reference value may be set to 170.

The i−1-th pixel gain value for the i−1-th pixel PX_i−1 arranged adjacent to the i-th pixel PX_i at a left side of the i-th pixel PX_i is expressed by the following Expression 7.

$$(\text{Max\_th4} - \text{pxl\_i}-1) / \text{Max\_th4} - \text{Min\_th4}) \qquad [\text{Expression 7}]$$

In Expression 7, "Max_th4" represents a predetermined fourth maximum reference value, "Min_th4" represents a predetermined fourth minimum reference value, and "pxl_i−1" represents a brightness value of the i−1-th pixel PX_i−1. In this case, the fourth maximum reference value may be set to 290, and the fourth minimum reference value may be set to 210.

On the other hand, the i+1-th pixel gain value for the i+1-th pixel PX_i−1 arranged adjacent to the i-th pixel PX_i at a right side of the i-th pixel PX_i is expressed by the following Expression 8.

$$(\text{Max\_th4} - \text{pxl\_i}+1) / (\text{Max\_th4} - \text{Min\_th4}) \qquad [\text{Expression 8}]$$

In Expression 8, "Max_th4" represents the predetermined fourth maximum reference value, "Min_th4" represents the predetermined fourth minimum reference value, and "pxl_i+1" represents a brightness value of the i+1-th pixel PX_i+1.

After calculation of the i-th pixel gain value, i−1-th pixel gain value, and i+1-th pixel gain value, the pixel depth map generator 203B selects a higher one of the i−1-th pixel gain value and i+1-th pixel gain value, and defines the selected pixel gain value as a side pixel gain value. The pixel depth map generator 203B then multiplies the i-th pixel gain value, side pixel gain value, second vertical weight value, and pattern gain value to calculate a second total gain value.

In this case, the second vertical weight value is expressed by the Expression 4. Provided, when the second vertical weight value has a decimal value, the decimal value is used unchanged. That is, the second vertical weight value may have a decimal value.

Thereafter, the pixel depth map generator 203B searches the original depth map d-mp_org for an original depth value assigned to the i-th pixel PX_i. The pixel depth map generator 203B then adds the second total gain value to the searched original depth value to calculate a pixel depth value for the i-th pixel PX_i.

That is, the pixel depth value for the i-th pixel PX_i is expressed by the following Expression 9.

$$\begin{aligned}&\text{Original Depth Value} + (\text{Second Vertical Weight Value} \times \\ &\text{i-th Pixel Gain Value} \times \text{Side Pixel Gain Value} \times \\ &\text{Pattern Gain Value})\end{aligned} \qquad [\text{Expression 9}]$$

In order to derive the pixel depth value for the i-th pixel PX_i (namely, the particular pixel PX_i), the pixel gain value obtained from the i-th pixel, the side pixel gain value obtained from two pixels arranged adjacent to the i-th pixel PX_i at the left and right sides of the i-th pixel PX_i (i−1-th pixel PX_i−1 and i+1-th pixel PX_i+1), the second vertical weight value obtained from the vertical position of the i-th pixel PX_i, and the original depth value corresponding to the i-th pixel PX_i are needed.

The pixel depth map generator 203B calculates a pixel depth value for each of the remaining pixels in the above described manner, based on the position of the pixel.

However, when the specific pixel is positioned at the left edge or right edge of the display screen DSP, the side pixel gain value in this case is obtained from one adjacent pixel. For example, when the specific pixel, for which a pixel depth value is to be derived, is positioned at the left end of the display screen DSP, the gain value obtained from the pixel arranged adjacent to the specific pixel at the right side of the specific pixel is used as the side pixel gain value because there is no pixel arranged at the left side of the specific pixel. On the other hand, when the specific pixel is positioned at the right end of the display screen DSP, the gain value obtained from the pixel arranged adjacent to the specific pixel at the left side of the specific pixel is used as the side pixel gain value because there is no pixel arranged at the right side of the specific pixel.

When the pixel depth values for all pixels are calculated in the above described manner, a pixel-based depth map d-mp_pxl based on the pixel depth values is generated.

Meanwhile, the above described i-th pixel gain value, i−1-th pixel gain value, i+1-th pixel gain value, and second vertical weight value may have negative values, respectively. Negative values are converted into zeros. That is, the above described values cannot be smaller than 0.

Corrected Depth Map Generator 204

The corrected depth map generator 204 generates a corrected depth map d-mp_cr, based on the block-based depth map d-mp_blk from the block depth map generator 203A and the pixel-based depth map d-mp_pxl from the pixel depth map generator 203B. Hereinafter, such operation of the corrected depth map generator 204 will be described in detail with reference to FIG. 7.

Figure 7:
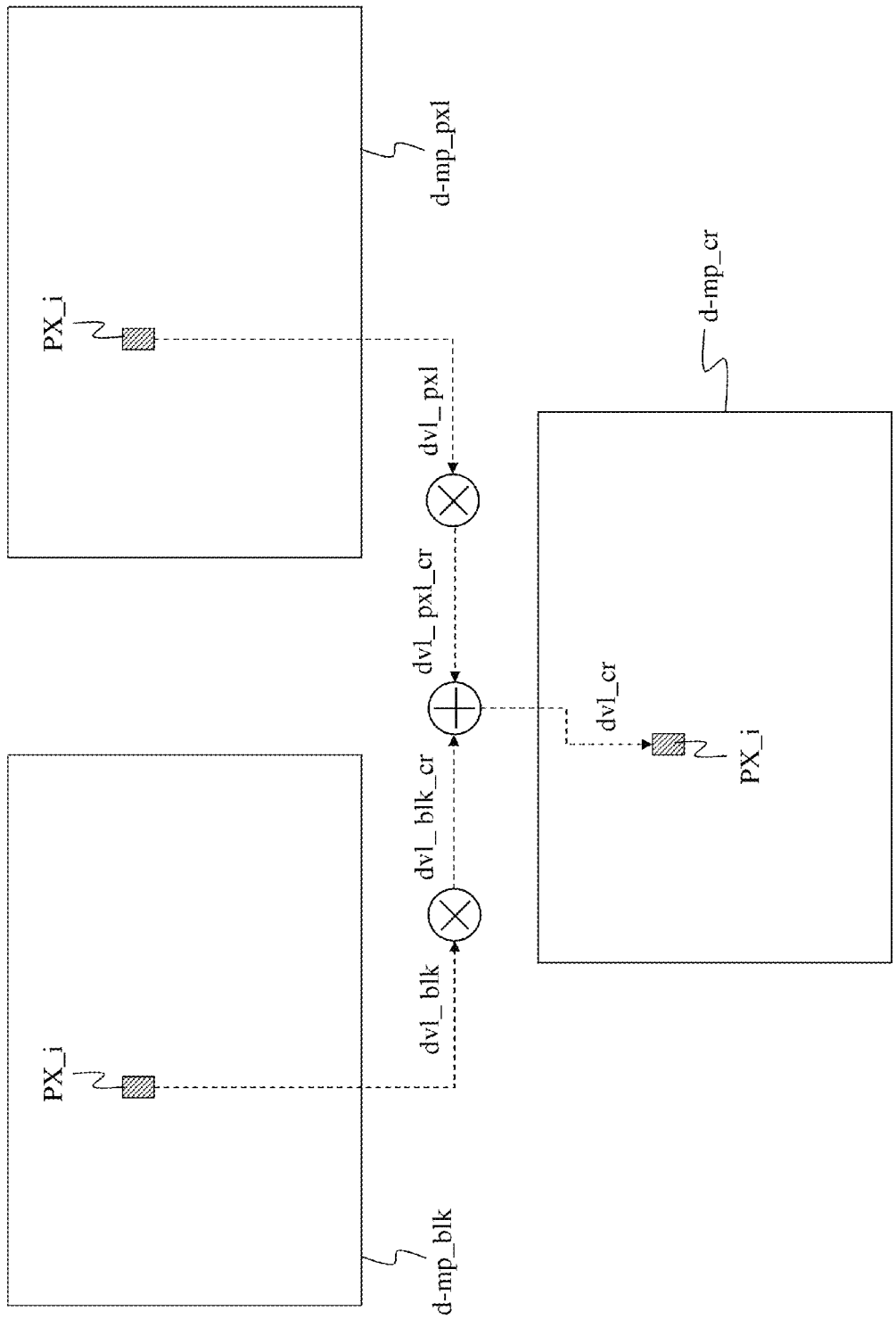
FIG. 7 is a diagram explaining operation of a corrected depth map generator.

FIG. 7 is a diagram explaining operation of the corrected depth map generator 204.

As illustrated in FIG. 7, the corrected depth map generator 204 searches the block-based depth map d-mp_blk for a block depth value dvl_blk assigned to the specific pixel PX_i while searching the pixel-based depth map d-mp_pxl for a pixel depth value dvl_pxl assigned to the specific pixel PX_i. Thereafter, the corrected depth map generator 204 multiplies the searched block depth value dvl_blk by a first correction gain value to calculate a corrected block depth value dvl_blk_cr. The corrected depth map generator 204 also multiplies the searched pixel depth value dvl_pxl by a second correction gain value to calculate a corrected pixel depth value dvl_pxl cr. Subsequently, the corrected depth map generator 204 sums the corrected block depth value dvl_blk_cr and corrected pixel depth value dvl_pxl cr to calculate a final corrected depth value dvl_cr for the specific pixel PX_i.

The corrected depth map generator 204 calculates a corrected depth value for each of the remaining pixels in the above described manner.

In accordance with calculation of corrected depth values for all pixels as described above, a final corrected depth map d-mp_cr is generated.

Meanwhile, the sum of the first correction gain value and second correction gain value is 1 and, as such, for example, the first correction gain value is 0.7, and the second correction gain value is 0.3.

Meanwhile, the corrected depth map d-mp_cr is applied to a three-dimensional image generating unit which is not illustrated. The three-dimensional image generating unit processes the frame image data img_data, based on the corrected depth map d-mp_cr, thereby converting the frame image data img_data into three-dimensional frame image data.

Meanwhile, for next frame image data subsequently input to follow the above described frame image data img_data, image pattern analysis is executed in the same manner as described above and, as such, a corrected depth map d-mp_cr is generated. That is, the depth map correcting apparatus of the present invention determines image characteristics for each frame, and generates a correction depth map d-mp_cr for each frame.

Figure 8:
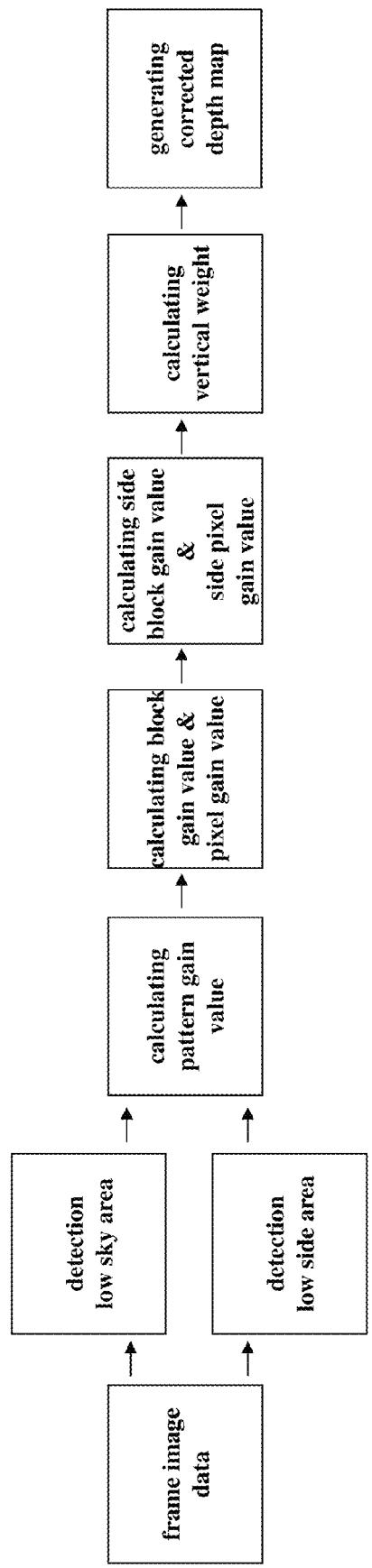
FIG. 8 is a flowchart illustrating a method for correcting a depth map for a three-dimensional image in accordance with an exemplary embodiment of the present invention.

FIG. 8 is a flowchart illustrating a method for correcting a depth map for a three-dimensional image in accordance with an exemplary embodiment of the present invention.

In accordance with the illustrated correcting method, as illustrated in FIG. 8, the three-dimensional image depth map correcting apparatus of the present invention analyzes frame image data img_data to detect a sky area SK and a side area SD. The correcting apparatus then detects dark portions of the sky area SK and side area SD (namely, detection of a low sky area SK and a low side area SD). Based on the detected results, the correcting apparatus determines an image pattern of the frame image.

Thereafter, the depth map correcting apparatus calculates a pattern gain value based on the determined image pattern.

The depth map correcting apparatus then calculates block gain values and pixel gain values as described above.

Subsequently, the depth map correcting apparatus calculates side block gain values and side pixel gain values as described above.

The depth map correcting apparatus also calculates vertical weight values based on vertical positions of pixels.

Finally, the depth map correcting apparatus corrects the original depth map d-mg org, based on the block gain values, pixel gain values, side block gain values, side pixel gain values, and vertical weights, thereby generating a corrected depth map d-mp_cr.

Thus, the depth map correcting apparatus according to the present invention identifies image characteristics, to increase a depth value of a specific pixel when the brightness value of the specific pixel is lower than a predetermined reference value (for example, a maximum reference value) while maintaining the depth value of the specific pixel when the brightness value of the specific pixel (original depth value) is higher than the reference value. However, if at least one of the pixels arranged at opposite sides of the specific pixel has a lower brightness value than the reference value, even though the brightness value of the specific pixel is higher than the reference value, the depth value of the specific pixel may be increased. However, when the brightness value of the specific pixel is considerably high (for example, when the brightness value of the specific pixel exceeds the maximum reference value), the depth value of the specific pixel is maintained.

When both the sky area SK and the side area SD are dark areas exhibiting a lower brightness value than the reference brightness value (third pattern image), the depth map correcting apparatus according to the present invention determines pixels having relatively low brightness values as a background area. On the other hand, when at least one of the sky area SK and side area SD is not a dark area, the depth map correcting apparatus determines that pixels having relatively low brightness values are arranged to be closer to a front side of the display screen. The depth map correcting apparatus also adaptively calculates depth values of pixels in the area, which is determined as a dark area, in accordance with the gain value of the area.

In order to avoid abrupt image variation between successive frames, an optimal difference between the reference maximum value and the reference minimum value is predetermined.

FIGS. 9 to 11 are views explaining effects of the three-dimensional image depth map generating apparatus according to an exemplary embodiment of the present invention.

FIG. 9(a) illustrates original frame image data img_data. FIG. 9(b) illustrates an original depth map d-mp_org. FIG. 9(c) is a corrected depth map d-mp_cr.

The area A in FIG. 9(a), the area B in FIG. 9(b), and the area C in FIG. 9(c) are the same area corresponding to a particular portion of the display screen DSP.

As illustrated in FIG. 9(a), the area B of the original depth map d-mp_org generated based on the original frame image data img_data exhibits a considerably low brightness value corresponding to a dark level because the area A of the original frame image data img_data has a low grayscale level corresponding to a dark level, in spite of the fact that the area A has a considerably forwardly protruded shape. This is because there is a limitation in the method of generating the original depth map d-mp_org, as described above.

However, the area C of the corrected depth map d-mp_cr as illustrated in FIG. 9(c) is correctly displayed, using a considerably high grayscale level corresponding to a bright level, differently than the area B. This is because the original depth map d-mp_org is accurately corrected in accordance with the depth map correcting method according to the present invention.

FIG. 10(a) illustrates original frame image data img_data. FIG. 10(b) illustrates an original depth map d-mp_org. FIG. 10(c) is a corrected depth map d-mp_cr. Referring to FIGS. 10(a) to 10(c), it can be seen that the grayscale level of the corrected depth map d-mp_cr is correctly rendered.

Similarly, FIG. 11(a) illustrates original frame image data img_data. FIG. 11(b) illustrates an original depth map d-mp_org. FIG. 11(c) is a corrected depth map d-mp_cr. Referring to FIGS. 11(a) to 11(c), it can be seen that the grayscale level of the corrected depth map d-mp_cr is correctly rendered.

The apparatus and method for generating a depth map for a three-dimensional image in accordance with the present invention have the following effects.

That is, in accordance with the present invention, frame image data is analyzed to calculate an image pattern and a brightness value of each pixel. Based on the image pattern and brightness value, an original depth map generated from an original depth map generating unit is accurately corrected. Thus, it is possible to generate a depth map having more accurate three-dimensional information.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An apparatus for correcting a depth map for a three-dimensional image, comprising:
    an original depth map generating unit for receiving frame image data for a 2D image for both a left eye and a right eye of a user and generating an original depth map for the frame image data for the 2D image; and
    a depth map correcting unit for analyzing the frame image data, calculating an image pattern of the frame image data for the 2D image for both the left eye and the right eye of a user and per-pixel brightness values of the frame image data based on results of the analysis, and correcting the original depth map output from the original depth map generating unit based on the calculated image pattern and the calculated per-pixel brightness values thereby generating a corrected depth map,
    wherein the depth map correcting unit comprises:
    a brightness extractor for extracting the per-pixel brightness values from the frame image data for the 2D image;
    an image pattern analyzer for identifying the image pattern of the frame image data for the 2D image based on the per-pixel brightness values output from the brightness extractor, and outputting a predetermined pattern gain value based on results of the identification;
    a block depth map generator for classifying pixels of the frame image data for the 2D image into n pixel blocks (n being a natural number greater than 1) based on spatial positions of the pixels within the frame image data, calculating an average brightness value of each of the n pixel blocks while referring to the per-pixel brightness values output from the brightness extractor, and correcting the original depth map output from the original depth map generator based on the average brightness value of each of the n pixel blocks and the predetermined pattern gain value from the image pattern analyzer thereby generating a block-based depth map;
    a pixel depth map generator for correcting the original depth map output from the original depth map generating unit, based on the per-pixel brightness values from the brightness extractor and the predetermined pattern gain value from the image pattern analyzer thereby generating a pixel-based depth map; and
    a corrected depth map generator for generating a corrected depth map based on the block-based depth map from the block depth map generator and the pixel-based depth map from the pixel depth map generator.

2. The apparatus according to claim 1, wherein the image pattern analyzer classifies the pixels of the frame image data into m pattern blocks (m being a natural number greater than 1) based on the spatial positions of the pixels, groups a part of the m pattern blocks into a sky area while grouping another part of the m pattern blocks into a side area, calculates an average brightness value of the sky area and an average brightness value of the side area while referring to the brightness values output from the brightness extractor, identifies the image pattern of the frame image data based on the calculated average brightness values, and selects a pattern gain value based on results of the identification.

3. The apparatus according to claim 2, wherein the image pattern analyzer compares the average brightness value of the sky area with a predetermined reference brightness value, compares the average brightness value of the side area with the reference brightness value, and selects one pattern gain value from a plurality of predetermined pattern gain values, based on results of the comparison.

4. The apparatus according to claim 3, wherein the image pattern analyzer classifies the pixels into 9 pattern blocks, groups three horizontally-adjacent pattern blocks spatially arranged at an uppermost side of the 9 pattern blocks into the sky area, and groups two vertically-adjacent pattern blocks spatially arranged at a left edge side of the 9 pattern blocks and two vertically-adjacent pattern blocks spatially arranged at a right edge side of the 9 pattern blocks into the side area.

5. The apparatus according to claim 4, wherein:
    the image pattern analyzer recognizes that the externally-supplied frame image data has a first image pattern, when the average brightness value of the sky area is lower than or equal to the reference brightness value, and the average brightness value of the side area is higher than the reference brightness value, and then selects a first one of the pattern gain values;

the image pattern analyzer recognizes that the externally-supplied frame image data has a second image pattern, when the average brightness value of the sky area is higher than the reference brightness value, and the average brightness value of the side area is lower than or equal to the reference brightness value, and then selects a second one of the pattern gain values;

the image pattern analyzer recognizes that the externally-supplied frame image data has a third image pattern when the average brightness value of the sky area is lower than or equal to the reference brightness value, and the average brightness value of the side area is lower than or equal to the reference brightness value, and then selects a third one of the pattern gain values; and the image pattern analyzer recognizes that the externally-supplied frame image data has a fourth image pattern when the average brightness value of the sky area is higher than the reference brightness value, and the average brightness value of the side area is higher than the reference brightness value, and then selects a fourth one of the pattern gain values.

6. The apparatus according to claim 5, wherein the first pattern gain value is 0.3, the second pattern gain value is 0.7, the third pattern gain value is 0, and the fourth pattern gain value is 1.

7. The apparatus according to claim 1, wherein:
the block depth map generator further calculates a first vertical weight for one pixel in each of the pixel blocks based on a vertical position of the pixel, and corrects the original depth map based on the average brightness value of the pixel block, the pattern gain value from the image pattern analyzer, and the first vertical weight; and the pixel depth map generator further calculates a second vertical weight for one of the pixels based on a vertical position of the pixel, and corrects the original depth map based on the per-pixel brightness values from the brightness extractor, the pattern gain value from the image pattern analyzer, and the second vertical weight, thereby generating a pixel-based depth map.

8. The apparatus according to claim 7, wherein:
the first vertical weight and the second vertical weight are expressed by the following Expression 1:

$$(HL\_total/60) - (N\_HL\_pxl/60) \times 8 \quad \text{[Expression 1]}$$

where, HL_total represents a total number of horizontal lines of a display screen, and N_HL_pxl represents a number identifying one horizontal line where a particular one of the pixels is arranged; and when the first vertical weight has a decimal value, the first vertical weight is rounded off to one decimal place.

9. The apparatus according to claim 7, wherein:
the block depth map generator calculates a k-th block gain value for a k-th one of the pixel blocks where a particular one of the pixels is arranged based on the average brightness value of the k-th pixel block, calculates a k−1-th block gain value for a k−1-th one of the pixel blocks, which is arranged adjacent to the k-th pixel block at a left side of the k-th pixel block based on the average brightness value of the k−1-th pixel block, and calculates a k+1-th block gain value for a k+1-th one of the pixel blocks, which is arranged adjacent to the k-th pixel block at a right side of the k-th pixel block based on the average brightness value of the k+1-th pixel block;

the block depth map generator defines a higher one of the k−1-th and k+1-th block gain values as a side block gain value;

the block depth map generator multiplies the k-th block gain value, the side block gain value, the first vertical weight and the pattern gain value to calculate a first total gain value;

the block depth map generator searches the original depth map for an original depth value assigned to the particular pixel, and adds the first total gain value to the searched original depth value to calculate a block depth value for the particular pixel; and the block depth map generator executes the block depth value calculation for all of the pixels, thereby generating the block-based depth map.

10. The apparatus according to claim 9, wherein:
the k-th block gain value is expressed by the following Expression 1, the k−1-th block gain value is expressed by the following Expression 2, and the k+1-th block gain value is expressed by the following Expression 3:

$$(Max\_th1 - bli\_apl\_k)/Max\_th1 - Min\_th1) \quad \text{[Expression 1]},$$

$$(Max\_th2 - bli\_apl\_k-1)/Max\_th2 - Min\_th2), \quad \text{[Expression 2]},$$

and $$(Max\_th2 - blk\_apl_{k+}1)/Max\_th2 - Min\_th2) \quad \text{[Expression 3]},$$

where, Max_th1 represents a predetermined first maximum reference value, Min_th1 represents a predetermined first minimum reference value, Max_th2 represents a predetermined second maximum reference value, Min_th2 represents a predetermined second minimum reference value, blk_apl_k represents an average brightness value of the k-th pixel block, blk_apl_k−1 represents an average brightness value of the k−1-th pixel block, and blk_apl_k+1 represents an average brightness value of the k+1-th pixel block.

11. The apparatus according to claim 10, wherein the first maximum reference value, the first minimum reference value, the second maximum reference value, and the second minimum reference value are 400, 200, 440, and 240, respectively.

12. The apparatus according to claim 7, wherein:
the pixel depth map generator calculates an i-th pixel gain value for an i-th specific one of the pixels, based on the brightness value of the i-th pixel, calculates an i−1-th pixel gain value for an i−1-th one of the pixels, which is arranged adjacent to the i-th pixel at a left side of the i-th pixel, based on the brightness value of the i−1-th pixel, and calculates an i+1-th pixel gain value for the i+1-th one of the pixels, which is arranged adjacent to the i-th pixel at a right side of the i-th pixel, based on the brightness value of the i+1-th pixel;

the pixel depth map generator defines a higher one of the i−1-th and i+1-th pixel gain values as a side pixel gain value;

the pixel depth map generator multiplies the i-th pixel gain value, the side pixel gain value, the second vertical weight and the pattern gain value to calculate a second total gain value;

the pixel depth map generator searches the original depth map for an original depth value assigned to the i-th pixel, and adds the second total gain value to the searched original depth value to calculate a pixel depth value for the i-th pixel; and the pixel depth map generator executes the pixel depth value calculation for all of the pixels, thereby generating the pixel-based depth map.

13. The apparatus according to claim 12, wherein:
the i-th pixel gain value is expressed by the following Expression 1, the i−1-th pixel gain value is expressed by the following Expression 2, and the i+1-th pixel gain value is expressed by the following Expression 3:

(Max_th3−pxl_i)/Max_th3−Min_th3)  [Expression 1], (Max_th4−pxl_i−1)/Max_th4−Min_th4)  [Expression 2], and (Max_th4−pxl_i+1)/Max_th4−Min_th4)  [Expression 3], where, Max_th3 represents a predetermined third maximum reference value, Min_th3 represents a predetermined third minimum reference value, Max_th4 represents a predetermined fourth maximum reference value, Min_th4 represents a predetermined fourth minimum reference value, pxl_i represents a brightness value of the i-th pixel, pxl_i−1 represents a brightness value of the i−1-th pixel, and pxl_i+1 represents a brightness value of the i+1-th pixel.

14. The apparatus according to claim 13, wherein the third maximum reference value, the third minimum reference value, the fourth maximum reference value, and the fourth minimum reference value are 250, 170, 290, and 210, respectively.

15. The apparatus according to claim 1, wherein the corrected depth map generator searches the block-based depth map for a block depth value assigned to the specific pixel, searches the pixel-based depth map for a pixel depth value assigned to the specific pixel, multiplies the searched block depth value by a first correction gain value to calculate a corrected block depth value, multiplies the searched pixel depth value by a second correction gain value to calculate a corrected pixel depth value, sums the corrected block depth value and the corrected pixel depth value to calculate a corrected depth value for the specific pixel, and executes the corrected depth value calculation for all of the pixels, thereby generating the corrected depth map.

16. The apparatus according to claim 15, wherein a sum of the corrected block depth value and the corrected pixel depth value is 1.

17. The apparatus according to claim 16, wherein the first correction gain value is 0.7 and the second correction gain value is 0.3.

18. A method for correcting a depth map for a three-dimensional image, comprising the steps of:
receiving frame image data for a 2D image for both a left eye and a right eye of a user;
generating an original depth map for the frame image data for the 2D image;
analyzing the externally-supplied frame image data;
calculating an image pattern of the frame image data for the 2D image for both the left eye and the right eye of a user and per-pixel brightness values of the frame image data based on results of the analysis; and
correcting the original depth map based on the calculated image pattern and the calculated brightness values, thereby generating a corrected depth map,
wherein calculating the image pattern comprises:
extracting the per-pixel brightness values from the frame image data for the 2D image;
identifying the image pattern of the frame image data for the 2D image based on the per-pixel brightness values, and outputting a predetermined pattern gain value based on results of the identification;
wherein correcting the original depth map comprises:
classifying pixels of the frame image data for the 2D image into n pixel blocks (n being a natural number greater than 1) based on spatial positions of the pixels within the frame image data, calculating an average brightness value of each of the n pixel blocks while referring to the per-pixel brightness values, and correcting the original depth map output based on the average brightness value of each of the n pixel blocks and the predetermined pattern gain value thereby generating a block-based depth map;
correcting the original depth map output based on the per-pixel brightness values and the predetermined pattern gain value thereby generating a pixel-based depth map; and
generating a corrected depth map based on the block-based depth map from the block depth map generator and the pixel-based depth map.

19. The method according to claim 18, wherein identifying the image pattern comprises classifying the pixels of the frame image data into m pattern blocks (m being a natural number greater than 1) based on the spatial positions of the pixels, grouping a part of the m pattern blocks into a sky area while grouping another part of the m pattern blocks into a side area, calculating an average brightness value of the sky area and an average brightness value of the side area while referring to the brightness values, identifying the image pattern of the frame image data based on the calculated average brightness values, and selecting a pattern gain value, based on results of the identification.

20. The method according to claim 19, wherein identifying the image pattern comprises comparing the average brightness value of the sky area with a predetermined reference brightness value, comparing the average brightness value of the side area with the reference brightness value, and selecting one pattern gain value from a plurality of predetermined pattern gain values, based on results of the comparison.

21. The method according to claim 20, wherein identifying the image pattern comprises classifying the pixels into 9 pattern blocks, grouping three horizontally-adjacent pattern blocks spatially arranged at an uppermost side of the 9 pattern blocks into the sky area, and grouping two vertically-adjacent pattern blocks spatially arranged at a left edge side of the 9 pattern blocks and two vertically-adjacent pattern blocks spatially arranged at a right edge side of the 9 pattern blocks into the side area.

22. The method according to claim 21, wherein:
identifying the image pattern comprises recognizing that the externally-supplied frame image data has a first image pattern when the average brightness value of the sky area is lower than or equal to the reference brightness value, and the average brightness value of the side area is higher than the reference brightness value, and then selecting a first one of the pattern gain values; and
identifying the image pattern further comprises recognizing that the externally-supplied frame image data has a second image pattern when the average brightness value of the sky area is higher than the reference brightness value, and the average brightness value of the side area is lower than or equal to the reference brightness value, and then selecting a second one of the pattern gain values;
identifying the image pattern further comprises recognizing that the externally-supplied frame image data has a third image pattern when the average brightness value of the sky area is lower than or equal to the reference brightness value, and the average brightness value of the side area is lower than or equal to the reference brightness value, and then selecting a third one of the pattern gain values; and identifying the image pattern further comprises recognizing that the externally-supplied frame image data has a fourth image pattern when the average brightness value of the sky area is higher than the reference brightness value, and the average brightness value of the side area is higher than the reference brightness value, and then selecting a fourth one of the pattern gain values.

23. The method according to claim 22, wherein the first pattern gain value is 0.3, the second pattern gain value is 0.7, the third pattern gain value is 0, and the fourth pattern gain value is 1.

24. The method according to claim 18 wherein:
classifying the pixels further comprises calculating a first vertical weight for one pixel in each of the pixel blocks based on a vertical position of the pixel, and correcting the original depth map based on the average brightness value of the pixel block, the pattern gain value from the image pattern analyzer, and the first vertical weight; and
correcting the original depth map output further comprises calculating a second vertical weight for one of the pixels based on a vertical position of the pixel, and correcting the original depth map, based on the per-pixel brightness values from the brightness extractor, the pattern gain value from the image pattern analyzer, and the second vertical weight, thereby generating a pixel-based depth map.

25. The method according to claim 24, wherein:
the first vertical weight and the second vertical weight are expressed by the following Expression 1:

$$(HL\_total/60) - (N\_HL\_pxl/60) \times 8 \quad \text{[Expression 1]}$$

where, HL_total represents a total number of horizontal lines of a display screen, and N_HL_pxl represents a number identifying one horizontal line where a specific one of the pixels is arranged; and
when the first vertical weight has a decimal value, the first vertical weight is rounded off to one decimal place.

26. The method according to claim 24, wherein:
classifying the pixels comprises:
calculating a k-th block gain value for a k-th one of the pixel blocks where a specific one of the pixels is arranged, based on the average brightness value of the k-th pixel block, calculating a k−1-th block gain value for a k−1-th one of the pixel blocks, which is arranged adjacent to the k-th pixel block at a left side of the k-th pixel block based on the average brightness value of the k−1-th pixel block, and calculating a k+1-th block gain value for a k+1-th one of the pixel blocks, which is arranged adjacent to the k-th pixel block at a right side of the k-th pixel block, based on the average brightness value of the k+1-th pixel block;
defining a higher one of the k−1-th and k+1-th block gain values as a side block gain value;
multiplying the k-th block gain value, the side block gain value, the first vertical weight and the pattern gain value to calculate a first total gain value;
searching the original depth map for an original depth value assigned to the specific pixel, and adding the first total gain value to the searched original depth value to calculate a block depth value for the specific pixel; and
executing the block depth value calculation for all of the pixels, thereby generating the block-based depth map.

27. The method according to claim 26, wherein:
the k-th block gain value is expressed by the following Expression 1, the k−1-th block gain value is expressed by the following Expression 2, and the k+1-th block gain value is expressed by the following Expression 3:

$$(Max\_th1 - bli\_apl\_k)/Max\_th1 - Min\_th1) \quad \text{[Expression 1]},$$

$$(Max\_th2 - bli\_apl\_k-1)/Max\_th2 - Min\_{th}2), \quad \text{[Expression 2]},$$

and $$(Max\_th2 - blk\_apl\_k+1)/Max\_{th}2 - Min\_th2) \quad \text{[Expression 3]},$$

where, Max_th1 represents a predetermined first maximum reference value, Min_th1 represents a predetermined first minimum reference value, Max_th2 represents a predetermined second maximum reference value, Min_th2 represents a predetermined second minimum reference value, blk_apl_k represents an average brightness value of the k-th pixel block, blk_apl_k−1 represents an average brightness value of the k−1-th pixel block, and blk_apl_k+1 represents an average brightness value of the k+1-th pixel block.

28. The method according to claim 27, wherein the first maximum reference value, the first minimum reference value, the second maximum reference value, and the second minimum reference value are 400, 200, 440, and 240, respectively.

29. The method according to claim 24, wherein:
correcting the original depth map comprises:
calculating an i-th pixel gain value for an i-th specific one of the pixels based on the brightness value of the i-th pixel, calculating an i−1-th pixel gain value for an i−1-th one of the pixels, which is arranged adjacent to the i-th pixel at a left side of the i-th pixel based on the brightness value of the i−1-th pixel, and calculating an i+1-th pixel gain value for the i+1-th one of the pixels, which is arranged adjacent to the i-th pixel at a right side of the i-th pixel based on the brightness value of the i+1-th pixel;
defining a higher one of the i−1-th and i+1-th pixel gain values as a side pixel gain value;
multiplying the i-th pixel gain value, the side pixel gain value, the second vertical weight and the pattern gain value to calculate a second total gain value;
searching the original depth map for an original depth value assigned to the i-th pixel, and adding the second total gain value to the searched original depth value to calculate a pixel depth value for the i-th pixel; and
executing the pixel depth value calculation for all of the pixels, thereby generating the pixel-based depth map.

30. The method according to claim 29, wherein:
the i-th pixel gain value is expressed by the following Expression 1, the i−1-th pixel gain value is expressed by the following Expression 2, and the i+1-th pixel gain value is expressed by the following Expression 3:

$$(Max\_th3 - pxl\_i)/Max\_th3 - Min\_th3) \quad \text{[Expression 1]},$$

$$(Max\_th4 - pxl\_i-1)/Max\_th4 - Min\_th4), \quad \text{[Expression 2]},$$

and $$(Max\_th4 - pxl\_i+1)/Max\_th4 - Min\_th4) \quad \text{[Expression 3]},$$

where, Maxth3 represents a predetermined third maximum reference value, Min_th3 represents a predetermined third minimum reference value, Max_th4 represents a predetermined fourth maximum reference value, Min_th4 represents a predetermined fourth minimum reference value, pxl_i represents a brightness value of the i-th pixel, pxl_i−1 represents a brightness value of the i−1-th pixel, and pxl_i+1 represents a brightness value of the i+1-th pixel.

31. The method according to claim 30, wherein the third maximum reference value, the third minimum reference value, the fourth maximum reference value, and the fourth minimum reference value are 250, 170, 290, and 210, respectively.

32. The method according to claim 18, wherein generating the corrected depth map comprises searching the block-based depth map for a block depth value assigned to the specific pixel, searching the pixel-based depth map for a pixel depth value assigned to the specific pixel, multiplying the searched block depth value by a first correction gain value to calculate a corrected block depth value, multiplying the searched pixel depth value by a second correction gain value to calculate a corrected pixel depth value, summing the corrected block depth value and the corrected pixel depth value to calculate a corrected depth value for the specific pixel, and executing the corrected depth value calculation for all of the pixels, thereby generating the corrected depth map.

33. The method according to claim 32, wherein a sum of the corrected block depth value and the corrected pixel depth value is 1.

34. The method according to claim 33, wherein the first correction gain value is 0.7 and the second correction gain value is 0.3.

* * * * *